United States Patent [19]

Hyland

[11] Patent Number: 5,796,920
[45] Date of Patent: Aug. 18, 1998

[54] MULTIPROCESSOR SYSTEM AND METHOD FOR IDENTIFICATION AND ADAPTIVE CONTROL OF DYNAMIC SYSTEMS

[75] Inventor: David C. Hyland, Melbourne Beach, Fla.

[73] Assignee: Harris Corporation, Melbourne, Fla.

[21] Appl. No.: 293,654

[22] Filed: Aug. 19, 1994

[51] Int. Cl.$^6$ .......................... G06E 1/100; G06F 15/18
[52] U.S. Cl. .......................... 395/22; 395/21; 395/24
[58] Field of Search .............. 395/20–27; 382/155–159, 382/160, 161

[56] References Cited

PUBLICATIONS

Hyland, David C., Neural Network Architecture for On–Line System Identification and Adaptively Optimized Control, Proceedings of the 30Th Conference on Decision and Control, Brighton, England, Dec. 1991, pp.2552–7.

Hyland, David C., and King, James A., Neural Network Architectures for Stable Adaptive Control, Rapid Fault Detection and Control System Recovery, Proceedings of the Annual Rocky Mountain Guidance and Control Conference, pp.407–424, 1992.

Phan, Minh, Juang, Jer–nan, and Hylan, David C., On Neural Networks in Identification and Control of Dynamic Systems, NASA Technical Memorandum 107702, 1993.

Hert, John, Krogh, Anders, and Palmer, Richard G., Introduction to the Theory of Neural Computation, Addison–Wesley, pp. 115–130, 1991.

Primary Examiner—Tariq R. Hafiz
Attorney, Agent, or Firm—Rogers & Killeen

[57] ABSTRACT

A system and method for identifying and adapting a control system for a dynamic system includes in one embodiment massively parallel, decentralized signal processing equipment which can (1) identify a dynamic system; (2) adapt an on-line control system for the dynamic system; and/or, (3) solve off-line complex, nonlinear problems related to either static or dynamic systems. The disclosed system may include a neural network in which the neurons are two-way devices (forward and backward signal paths), each of which has a synaptic weight which is independently adjusted using only the forward and backward signals.

3 Claims, 32 Drawing Sheets

$$F(n) \; \frac{P^2(n)}{A^2(n)}$$

P = PERFORMANCE FUNCTION $$= \sqrt{\mathcal{L}(\tfrac{1}{2}\|\overline{\epsilon}(n)\|^2 - J^*)}$$

WHERE $\mathcal{L}(x) = \begin{cases} x : x \geq 0 \\ 0 : x < 0 \end{cases}$ $J^*$ = DESIRED m.s. ERROR LEVEL $A$ = NEURAL ACTIVITY LEVEL $$= \left( \sum_{\text{ALL SYNAPSE}} (x_\kappa^* x_\kappa)^2 \right)^{1/2}$$

WHERE $x_\kappa$ = FORWARD SIGNAL ON SYNAPSE $\kappa$ $x_\kappa^*$ = BACKWARD SIGNAL ON SYNAPSE $\kappa$

FOR A STRICTLY TOEPLITZ NETWORK:

$$A^2 = \sum_{\substack{\text{ALL TOEPLITZ} \\ \text{SYNAPSES}}} \|\overline{x}_\kappa^*\|^2 \|\overline{x}_\kappa\|^2$$

WHERE $\|\cdot\|$ IS THE FROBENIUS NORM.

FIG. 9

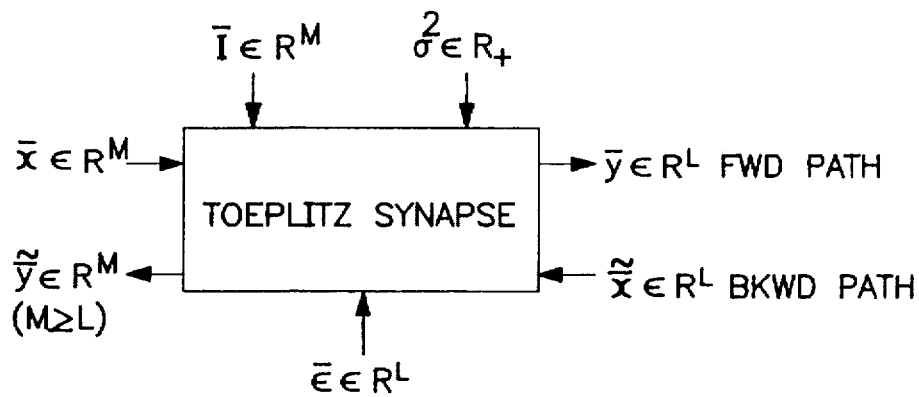

NOTATION:

$\bar{x}$ = INPUT VECTOR ON FORWARD SIGNAL PATH $\bar{y}$ = OUTPUT VECTOR ON FORWARD SIGNAL PATH $\tilde{x}$ = INPUT VECTOR ON BACKWARD PATH $\tilde{y}$ = OUTPUT VECTOR ON BACKWARD PATH $\bar{I}$ = BIAS INPUT TO FORWARD PATH $\bar{\epsilon}$ = BIAS INPUT TO BACKWARD PATH $\sigma^2$ = A POSITIVE SCALAR INPUT THAT IS GENERATED AT THE OUTPUT SYNAPSE OF THE OVERALL NETWORK (WHICH MAY CONTAIN MANY TOEPLITZ SYNAPSES). $\sigma^2$ IS BASICALLY THE MEAN SQUARE ERROR OF THE ENTIRE NET:

$\sigma^2 = (\bar{y}_* - \bar{\eta})^T (\bar{y}_* - \bar{\eta})$ $\bar{y}_*$ = OUTPUT OF THE OUTPUT SYNAPSE $\bar{\eta}$ = EXTERNAL SIGNAL THAT THE NET IS SUPPOSED TO MIMIC $\sigma^2$ IS GENERATED AT THE OUTPUT OF ONE SYNAPSE AND IS THEN PROVIDED AS A SCALAR INPUT TO ALL THE SYNAPSES IN THE NET.

FIG. 28A

INPUT/OUTPUT RELATIONS $$\bar{y} = w(\bar{x} + \bar{I})$$
$$\tilde{y} = w^T(\tilde{x} + \bar{\epsilon})$$

WHERE $w \in R^{L \times M}$ IS UPPER TRIANGULAR AND TOEPLITZ, i.e., w HAS THE FORM.

$$w = \begin{bmatrix} h_1 & h_2 & h_3 & h_4 & \cdots & h_L & \cdots h_M \\ 0 & h_1 & h_2 & h_3 & \cdots & h_{L-1} & \cdots h_{M-1} \\ 0 & 0 & h_1 & h_2 & \cdots & h_{L-2} & \cdots h_{M-2} \\ 0 & 0 & 0 & h_1 & \cdots & h_{L-3} & \cdots h_{M-3} \\ \vdots & \vdots & \vdots & \vdots & & \vdots & \vdots \\ 0 & 0 & 0 & 0 & \cdots & h_1 & \cdots h_{M-L+1} \end{bmatrix}$$

THUS w HAS ONLY M DISTINCT ELEMENTS: $h_1, h_2, \ldots, h_M$ AND EACH ROW OF w IS RIGHT-SHIFTED COPY OF THE PREVIOUS ROW.

WEIGHT UPDATE (UNDER THE ABOVE STRICT TOEPLITZ CONSTRAINT)

$\kappa = 1, \ldots, M$:

$$h_\kappa(n+1) = h_\kappa(n) + \mu(n) \sum_{i=1}^{MIN(L, M-\kappa+1)} (\tilde{x} + \bar{\epsilon})_i \, (\bar{x} + \bar{I})_{\kappa+i-1}$$

$$\mu(n) = \frac{1}{L} \alpha \sigma^2 / (\|\tilde{x} + \bar{\epsilon}\|^2 \, \|\bar{x} + \bar{I}\|^2)$$

$\alpha \equiv$ A BUILT-IN POSITIVE CONSTANT.

FIG. 28B

DYNAMIC GANGLION

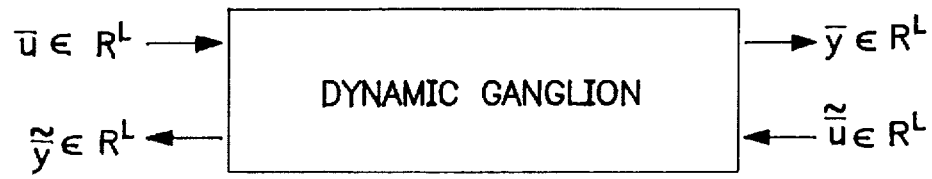

NOTATION:

$\bar{u}$ = INPUT VECTOR ON FORWARD PATH
$\bar{y}$ = OUTPUT VECTOR ON FORWARD PATH $\tilde{u}$ = INPUT VECTOR ON BACKWARD PATH
$\tilde{y}$ = OUTPUT VECTOR ON BACKWARD PATH

INPUT/OUTPUT RELATIONS $\kappa = 1, \ldots, L$:

WHERE:
$$\bar{y}_\kappa = g(\bar{u}_\kappa)$$
$$\tilde{y}_\kappa = g'(\bar{u}_\kappa) \, \tilde{u}_\kappa$$

$g(\cdot)$ = ANTISYMMETRIC SIGMOIDAL FUNCTION WITH ASYMPTOTIC VALUES OF $\pm$ G FOR arg $\rightarrow \infty$ i.e.,

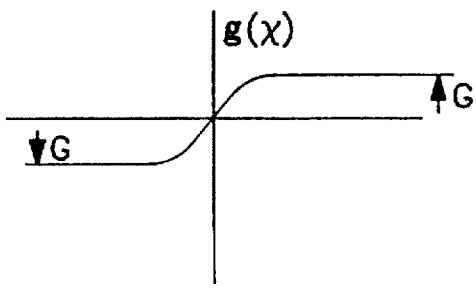

$g'(\cdot)$ = THE DERIVATIVE FUNCTION OF $g(\cdot)$
(NON-NEGATIVE, SYMMETRIC)

FIG. 29

BRANCH/SUM JUNCTIONS
(M-PRONGED)

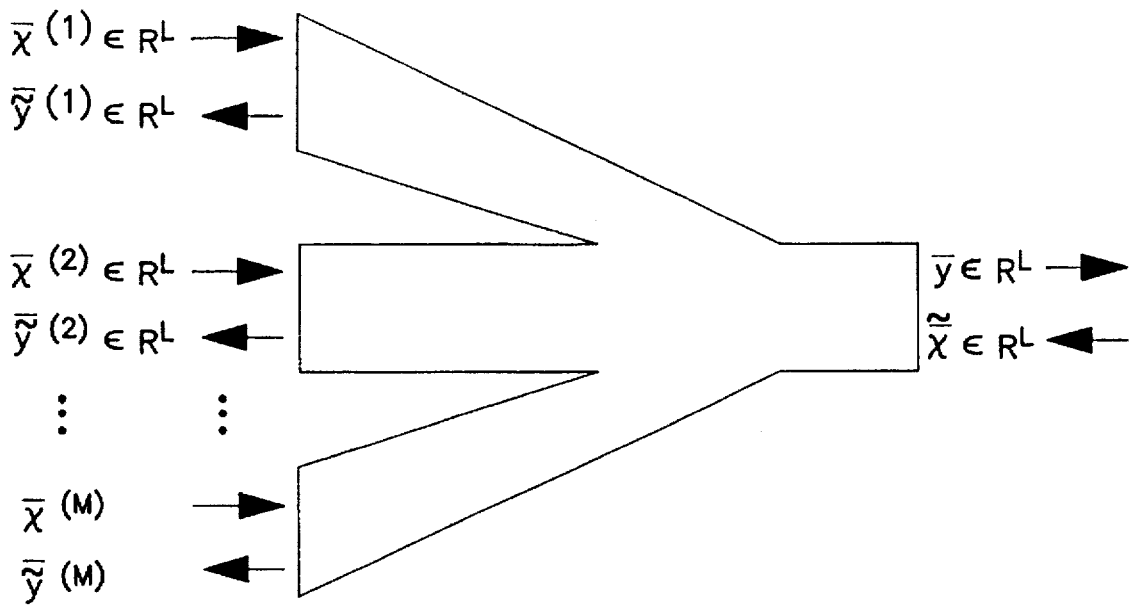

NOTATION:

$\bar{x}^{(1)} \ldots \bar{x}^{(M)}$ = M (L-DIMENSIONAL) VECTORS INPUT ON THE FORWARD PATH
$\bar{y}$ = OUTPUT VECTOR ON THE FORWARD PATH
$\tilde{x}$ = INPUT VECTOR ON THE BACKWARD PATH
$\tilde{y}^{(1)} \ldots \tilde{y}^{(M)}$ = M (L-DIMENSIONAL) VECTORS OUTPUT ON THE BACKWARD PATH

INPUT/OUTPUT RELATIONS $$k=1, \ldots, L: \quad y_k = \sum_{m=1}^{M} \bar{x}_k(m)$$

FOR ALL $m=1, \ldots, M: \quad \tilde{y}^{(m)} = \tilde{x}$

FIG. 30

MULTIPROCESSOR SYSTEM AND METHOD FOR IDENTIFICATION AND ADAPTIVE CONTROL OF DYNAMIC SYSTEMS

BACKGROUND OF THE INVENTION

The present invention relates generally to systems for identifying and controlling dynamic systems (or "plants") and particularly to a system and method of arranging massively parallel, decentralized signal processing equipment which is capable of (1) identification of dynamic systems (producing mathematical models directly from test data), (2) on-line adaptive control of dynamic systems and (3) off-line solution of complex, nonlinear optimization problems related to both dynamic and static systems. The dynamic system to be identified or controlled may be nonlinear or linear, time-varying or time invariant.

This application is related to a co-pending application by David Hyland and Jer-Nan Juang entitled "A Series Parallel Approach to Identification of Dynamic System" filed on the same day as the present application.

The disclosed multiprocessor architecture can be used in a variety of configurations; however, it can be readily described in terms of neural networks. Accordingly, the invention is described within the context of and using the concepts of neural networks.

It is known in the prior art to use neural networks for the identification and control of complex dynamic systems. A review of some of these networks can be found in "Identification and Control of Dynamical Systems Using Neural Networks," *IEEE Trans. on Neural Networks*, Vol., 1 No. 1, March 1990 by K. S. Narendra.

Much of the previous work in adaptive control and system identification via neural networks concentrated on highly nonlinear but low-dimensional systems. Often the methods developed in such networks were not adequate to address large dimensional (many dynamic states) systems that exhibit significant dynamic response over broad frequency bands.

Generally, neural network systems in the prior art used networks were built up of neurons that are purely one-way (forward signal path) devices, as shown in FIG. 1. As shown in FIG. 1, a typical neuron of the prior art may contain plural forward paths (1, $u_1$, $u_2$) each of which has a gain associated with it ($w_0$, $w_1$, $w_2$) and the signals on the paths are added and applied as the input to the neural activation function ($\gamma$ in the system of FIG. 1) to produce a neural output signal which may be sent to other neurons. The network is made to model a given system by adjusting the gains (or "synaptic weights") of the neurons until the network of neurons performs satisfactorily by closely replicating the dynamics of the given system. Generally in the prior art, in order to adjust the network's synaptic weights ($w_1$, $w_2$, . . . . etc.) in accordance with a predetermined update scheme, the user was required to set up an additional "sensitivity model," which is another neural net interconnected with the main network as shown in FIG. 2. In many cases, (with some exceptions) a separate sensitivity model is needed for each dynamic weight parameter being adjusted in the learning process. Such an arrangement is cumbersome, tends to make the network structure highly problem-dependent and effectively prevents standardization of components.

In contrast to the prior art the disclosed system and method use neurons that are inherently two-way devices (forward and backward signal paths) and each synaptic weight is independently adjusted using only the local forward and backward signals. In other words, the learning capability is embedded in the lowest level of structure (each neuron), so that the system's operations are decentralized and parallel. This massive parallelism permits enormous flexibility in implementation. Also, no extrinsic gimmicks or sensitivity subsystems are needed. Note that such two-way neurons involving intrinsic backprogagation are precisely what are used for "static" problems, such as pattern recognition and nonlinear mapping. The realization that both static problems and dynamic identification and control problems can be addressed by neural hardware having exactly the same structure leads to an efficient neural technology involving thoroughly standardized components.

The fundamental method for using two-way neurons in dynamics problems is to assemble special aggregations of neurons which are defined in such a way that identification and control of dynamic systems are effectively transformed into static pattern classification problems —for which neural networks have long been known to be effective. These special aggregations are completely standardized and are, in turn, combined to form higher level structures. The whole architecture disclosed here thus consists of a hierarchical sequence of standard modules all built up from two-way neurons. The standardization and modularity of the scheme greatly facilitate practical implementation and simplify future elaboration and development of the technology.

Another frequently observed problem in neural networks in the prior art is the difficulty in and the insufficient attention to the selection of the learning rates (or adaptive speeds) so as to guarantee stability. When addressed at all, the learning rate constants are usually determined on a trial and error basis. Such techniques are particularly unfortunate in neural networks since a major payoff expected of neural network technology is a high level of system autonomy. In contrast, the disclosed architecture involves update of the adaptive speeds (using only localized signal processing) so as to guarantee stability and convergence of the learning process under very broad conditions. In effect, the system of the present invention selects its own learning rates so as to secure built-in stability with no need of human intervention.

In the prior art, when neural networks were used to control a physical plant, the networks usually assumed that the controller was in some fixed form which is uniquely determined by the plant model. For example, most adaptive control research postulates the controller in the form of a simple dead-beat controller. This assumption essentially reduces the problem to an on-line identification of the plant Autoregressive Moving Average (ARMA) model coefficients. However, such restricted controller forms are not practical for many applications (e.g. vibration control) involving realistic actuator hardware limitations (limited stroke, force, bandwidth, etc.). Other similar kinds of restrictive control applications involve use of neural nets merely as static mappers—e.g., as in robotic arm control. In contrast, the disclosed system and method involve none of these restrictive assumptions. Generally, the present invention produces a general dynamic compensator which is in-situ optimized in accordance with the actual plant dynamics and actual control hardware limitations.

It is, therefore, an object of the present invention to provide a novel system and method for identification and control of systems which obviate these and other difficulties in the prior art.

It is another object of tie present invention to provide a novel system and method whereby a wide variety of dynamic systems can be controlled with a relatively small development effort in comparison to prior art systems.

It is a further object of the present invention to provide a novel neural network system which can be used in a variety of control system architectures.

It is still a further object of the present invention to provide a novel system and method which can be used off-line to solve complex dynamic system optimization problems using signals extracted from the systems to be controlled.

These and many other advantages and objects will be appreciated by those skilled in the art from a review of the following detailed description when read in conjunction with the appended drawings.

BRIEF DESCRIPTION OF THE DRAWINGS

FIG. 9 shows an adaptive speed update function which may be used in the invention.

FIG. 28A is a simplified block diagram of an alternate but equivalent arrangement for the Toeplitz synapse according to the invention.

FIG. 28B defines the data processing tasks for the alternate but equivalent arrangement for the Toeplitz synapse according to the invention.

FIG. 29 is a simplified block diagram for an alternate but equivalent arrangement of the nonlinear elements according to the invention.

FIG. 30 is a simplified block diagram for alternate but equivalent constructions of summing and branching junctions according to the inventions.

DETAILED DESCRIPTION OF THE EMBODIMENTS

The disclosed invention is a system and method which uses massively parallel architecture that is built up of standardized hierarchical units. Although the present system can be used in many different embodiments, the system is most readily described in terms of neural networks, set out below.

The system of the present invention may be applied to many different types of dynamic systems without being limited by the devices associated with a particular implementation. For example in its application to adaptive control, the invention is not restricted to any particular control architecture (e.g. feedforward, feedback, etc.). While a system of the present invention specifies the signal flow patterns among actuation devices, sensor devices and the control processor element, it is not limited to specific actuation and sensing devices.

Applications are general and wide-ranging: automated identification (extraction of mathematical models of dynamic phenomena directly from test data) of structures, high performance aircraft flight controls, damage detection in civil engineering structures, fault detection in active automobile suspension systems, medical diagnostics using passive acoustic sensors, on-line control of vibrations in solids, liquids and gases, control of chemical processes, robotic control, motion control for precision manufacturing, autonomous control for extended mission spacecraft, power regulation and heating system controls. Systems constructed according to the disclosed architecture can also be used off-line to solve complex optimization problems using numerical data and simulated inputs from the systems being optimized.

The disclosed processing architecture combines modular, standardized components to achieve its objectives. Modularity permits the parameters of the controller device to be fine tuned to specific applications with minimum development effort. The massive parallelism and decentralization of the disclosed architecture allows great latitude in the allocation of the computational burden. This implies implementation flexibility and many possible embodiments.

Figure 1:
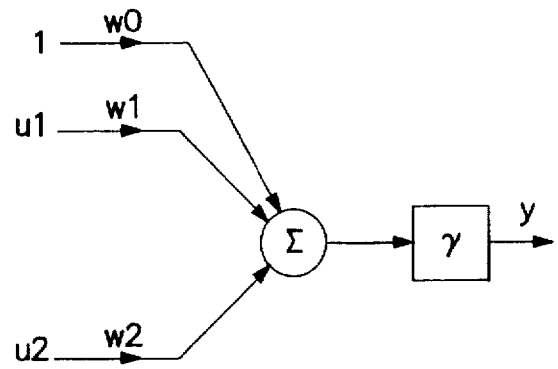
FIG. 1 is a simplified block diagram of a neuron as practiced in the prior art.
Figure 2:
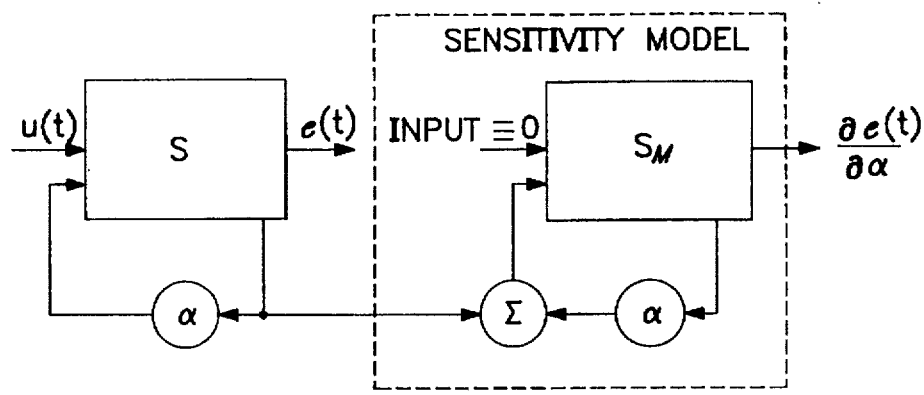
FIG. 2 is a simplified block diagram of a neural network including a sensitivity system as practiced in the prior art.
Figure 3:
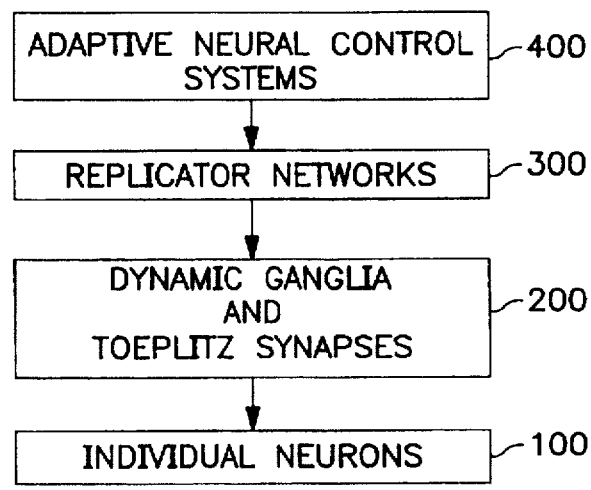
FIG. 3 is a simplified block diagram showing the hierarchy of modular devices according to the invention.

The hierarchy of modular structures that compose the disclosed architecture is depicted in FIG. 3. In the order progressing from basic constituents to higher-level modules, the modular structures include individual neurons 100 which are interconnected by synapses and dynamic ganglia 200 which are in turn, grouped into replicator networks 300, one or more of which may form an adaptive neural control system 400. For ease of explanation, all elements in the hierarchy are assumed to operate within the framework of a sampled data computational system—i.e. all external inputs are sampled periodically at some particular sample rate, all devices behave as discrete time systems and all outputs to external devices (e.g. actuators for control) are put through digital-to-analog converters. Thus, inputs and outputs as well as internal signals will be regarded as discrete time series with the time value denoted by some integer value.

The lowest level of the hierarchy as shown in FIG. 3 contains three devices: an individual neuron, an individual synaptic connector and a memory unit.

A memory unit is a form of tapped delay line that takes a scalar time series input and produces an L-dimensional vector output consisting of the present value of the input and its L−1 delayed values. A memory unit may be depicted as:

$$\xi(\kappa) \rightarrow \boxed{\begin{array}{c} MU \\ (L) \end{array}} \rightarrow \overline{\xi}(\kappa) \triangleq \begin{pmatrix} \xi(\kappa) \\ \vdots \\ \xi(\kappa-L+1) \end{pmatrix} \in IR^L$$

Figure 4A:
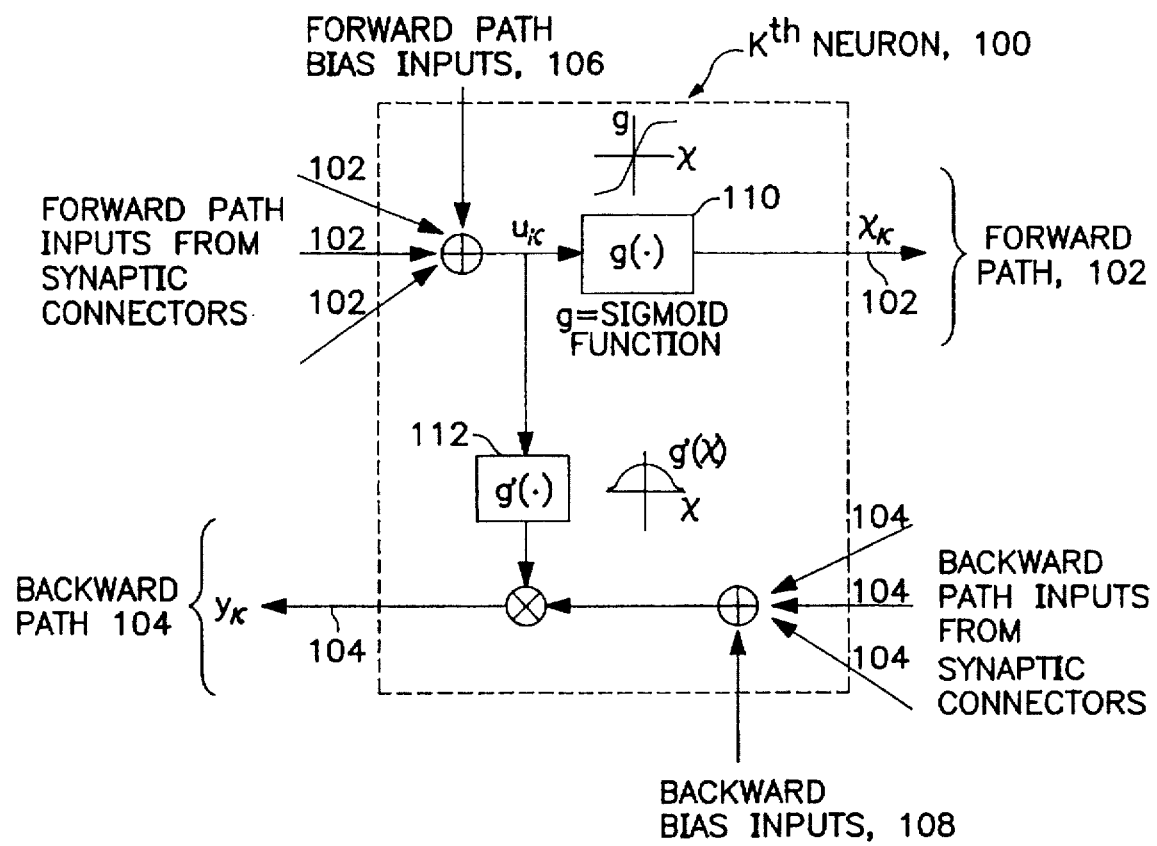
FIG. 4A is a simplified block diagram of the basic neuron according to the invention.

The result of passing any signal (•) through a memory unit is denoted by an over bar: $\overline{(\cdot)}$ With reference to FIG. 4A a neuron 100 can be defined in terms of its signal paths and operations. Unlike the one-way neurons usually postulated in neural net applications to adaptive control, the neuron used in the present invention is inherently a two-way device with a forward signal flow path 102 and a backward signal flow path 104. The neuron 100 receives a forward path bias input 106 and a backward path bias path input 108. Signals along the forward path 102 are operated on by the neural function 110, which may be a sigmoid function as illustrated in FIG. 4A. Signals along the backward path 104 are multiplied by the derivative of the neural function 112 (and may be the inverse sigmoid function). The forward and backward paths receive input signals from other neurons via synaptic connectors. On the forward path, during each computational cycle, the neuron sums the forward path inputs from the synaptic connectors and adds a forward path bias signal to form signal $u_k$ (see FIG. 4A). The bias signals are means to connect the system with the outside world, e.g. the forward bias might be a training stimulus injected to drive the learning process in the overall network. Signal $u_k$ is then passed through the neural function 110 (signoid nonlinearity), g(x), (called the activation function) to form the forward path output of the neuron, $x_k$. The neural function g(x) may be assumed to be differentiable and to have an approximately linear range for small values of x and to saturate at large values, approaching+1 as x→∞ and −1 as x→∞. The range of the values of the argument over which g is linear is a variable specification. In particular, as a special case g(x) can be linear; i.e. g(x)=x. In its forward path operations, the neuron is essentially the same as the customary definitions. Other neural functions may be used.

Fully localized computational capability is provided by the backward path operations that are executed simultaneously with the forward path. The neuron 100 sums the backward path bias inputs 108 (which may represent error signals injected into the network) and the backward path inputs 104. This signal is then multiplied by g'($u_k$) to form the backward path output signal $y_k$. g'(•) is the function formed from the derivative of g(•), and because of the characteristics assumed for g(•), is nonnegative with a single maximum at zero. Thus, the neuron 100 has a pair of inputs and a pair of outputs, each member of the pair being associated with signals flowing in opposite directions.

Figure 4B:
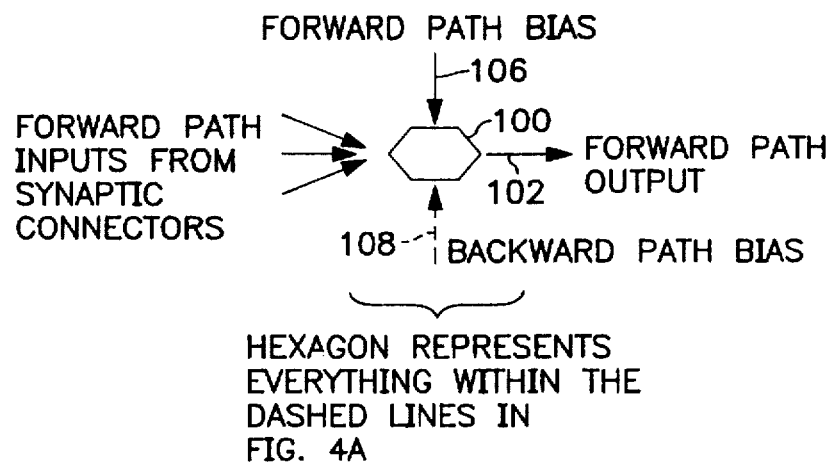
FIG. 4B shows the block diagram convention for the device shown in FIG. 4A.

With reference to FIG. 4B the neuron may be depicted in a simplified block diagram convention. The neuron as a whole is represented by a hexagon. Only the forward path signals are shown explicitly (the backward path operations can be inferred from the forward path). Forward path bias signals are always shown entering the top of the hexagon symbol and the backward path biases are shown entering the bottom.

The characteristics (such as g(•) and g'(•)) of the neuron 100 in a particular system are fixed and are not adapted over time. The capability to adapt over time actually resides, not in the neuron, but in the synaptic connectors (or simply synapses) which are elements that serve to link several neurons together. With reference to FIG. 5, a synaptic connector, 210 is also an inherently two way device with both forward and backward inputs and outputs. On a forward signal path 212, the synapse merely multiplies the input x by a real number, W(n) to produce an output y. W(n) is the synaptic weight or, more simply, the "weight" of the connector (sometimes called a "gain"). On a backward path 214, the same kind of operations occur: $\tilde{x}$ is multiplied by W(n) (the same weight as the forward path) to produce the backward path output $\tilde{y}$. Essentially the synapse is analogous to a bidirectional cable with the same resistance in both directions. In addition the synapse may also adjust its own weight. For example the synapse may use the formula in FIG. 5. The change in the weight from time n to time n+1 may be simply proportional to the product of the forward path input to the synapse and the backward path input to the synapse. This update rule, the "Hebbian" rule in the neural network literature, is purely decentralized or localized since, it uses only information available to the individual synapse. Of course, for each synaptic connector there is the option of constraining the weight—i.e. refraining from carrying out the weight update computation and, instead, setting the weight to a constant or equal to some externally supplied time varying signal.

The constant of proportionality in FIG. 5, $\mu(n)$, is called the adaptive speed since it governs the rapidity of learning. As discussed below, the adaptive speed is not necessarily a constant and may be updated (using local information) so as to guarantee convergence in both system identification and adaptive control.

Figure 5A:
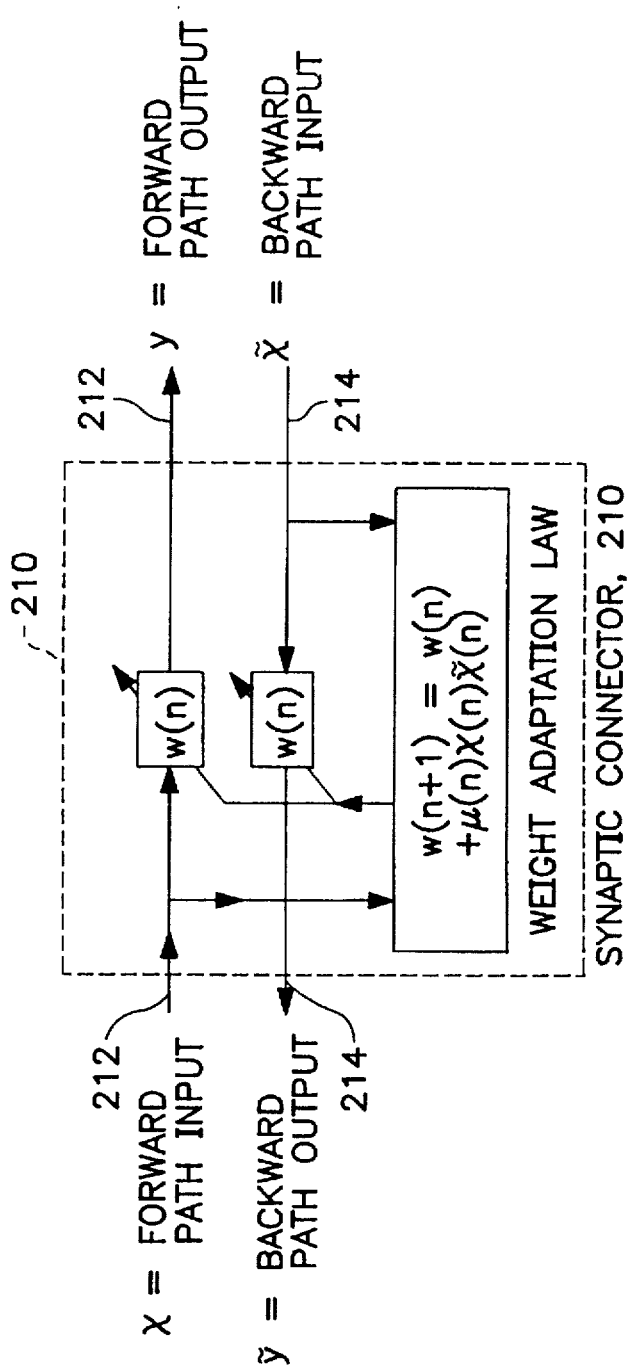
FIG. 5A is a simplified block diagram of the synaptic connector according to the invention.
Figure 5B:
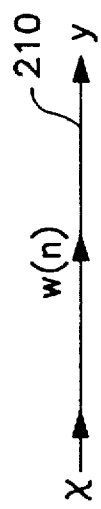
FIG. 5B shows the block diagram convention for the device shown in FIG. 5A.

With reference to FIG. 5B a simple block diagram convention for the synapse depicts simply a directed line with the synaptic weight indicated above the arrow. Once again, the backward path operations are implied while only the forward path signals are shown explicitly. If a weight constraint is not explicitly indicated, it may be assumed that the weight update formula in the top diagram of FIG. 5 is being carried out.

Figure 6A:
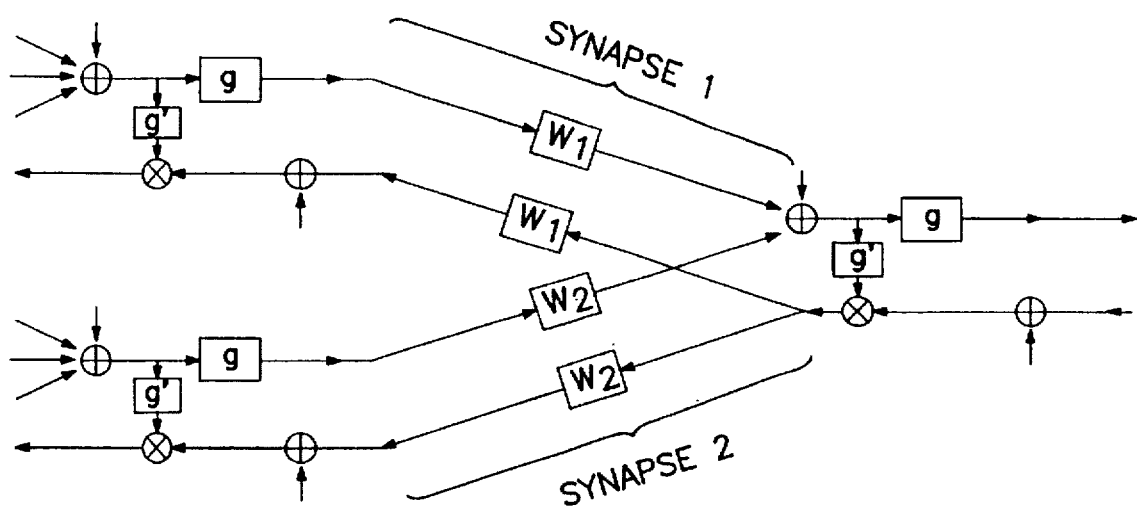
FIG. 6A is a simplified block diagram illustrating the interconnection of two way neurons and synaptic connectors which may be used in the invention.
Figure 6B:
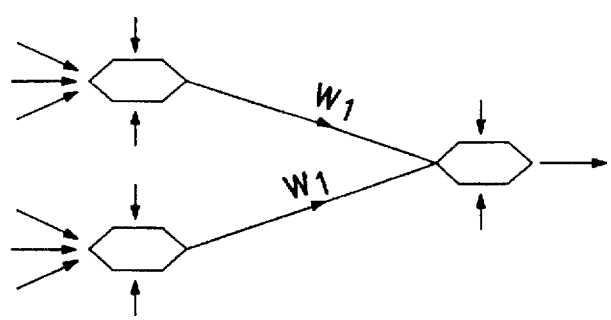
FIG. 6B illustrates the block diagram convention for the same system as in FIG. 6A.

Neural systems can be constructed consisting of several neurons linked by the synaptic connectors. To clarify how these bi-directional devices fit together, a three neuron, two synapse system has been constructed in FIG. 6A. FIG. 6B depicts the same arrangement of neurons and synapses as in FIG. 6A using the simplified notation identified in FIGS. 4B and 5B. This serves to illustrate how the two-way devices "dove-tail" and how the simple block diagrams are to be interpreted.

Systems built up of the neurons and synapses defined above are adequate to address static pattern classification and nonlinear mapping problems. By virtue of the backward signal path defined at the most fundamental level, back-propagation of error and adaptive learning capabilities are built in. Moreover, the learning capability is totally localized and decentralized—separate "sensitivity systems" and weight update computations are not needed. Each subdivision of a neural network composed of the elements defined above has a localized learning capability. This feature confers a high degree of fault tolerance—i.e. with a completely decentralized learning architecture, failure or damage to a subset of neurons will result in the remaining neurons eventually assuming the functions of the damaged components.

Figure 7A:
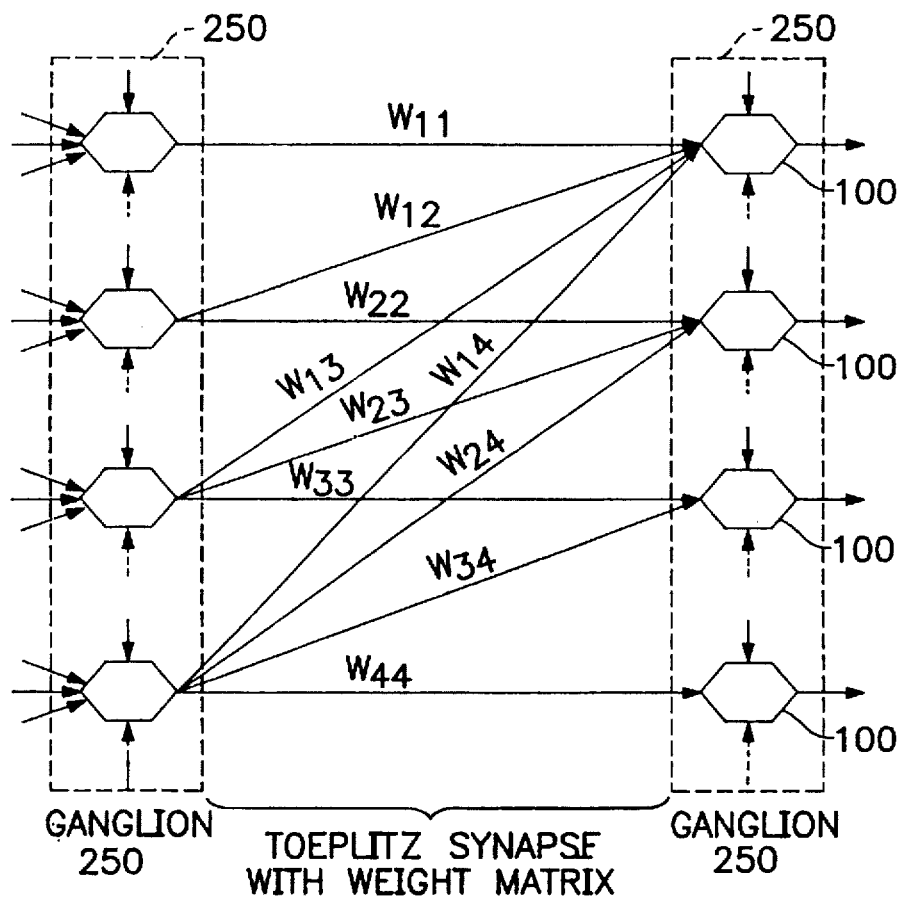
FIG. 7A is a simplified block diagram showing dynamic ganglia and the Toeplitz synapse according to the invention.

However, there remains the problem of applying networks of this type to tasks involving dynamic systems with time-varying input and output signals. This problem is addressed by the second member of the hierarchy shown in FIG. 3. The key in applying the neurons and synapses of FIGS. 4A and 5A to dynamic system identification is to organize the neurons into larger building blocks—termed the dynamic ganglia. As illustrated in FIG. 7A ganglia maybe connected by Toeplitz synapses. A ganglion 250 is an array or "stack" of neurons 100 such that neurons within the same stack are not connected, but are (at most) only connected to neurons in some other stack. Basically, this organization into stacks introduces a temporal ordering into the network: the position of a neuron in the ganglion 250 indicates the "age" of the data (relative to the present instant) it is meant to process. A neuron that is further from the top of the stack represents a time instant that is further into the past.

In general, two such stacks of neurons can be interconnected with any number of connections. However, it is desirable to impose connectivity constraints such that the neuron k places from the top in one ganglion receives (forward path) signals only from the neurons in another stack that are k places or more from the top. Any bundle of synaptic connectors obeying this constraint is termed a Toeplitz synapse. As illustrated in FIG. 7A, the weights of this bundle can be represented as an upper triangular matrix. Fundamentally, this upper triangular structure is designed to preserve temporal ordering and causality within higher order networks. In other words, by forbidding a top level neuron from one stack from feeding signals into a lower level neuron in another stack, the system is constrained to be capable of modelling only causal systems in which the future input signals cannot influence the past output signals.

To illustrate further, suppose that all neurons in FIG. 7A have linear $g(x)$ (i.e. for simplicity in this discussion, assume $g(x)=x$). Suppose also that each neuron in the left hand ganglion receives only one input signal—specifically the top neuron receives a bias signal $\xi(k)$, the next neuron receives the bias signal $\xi(k-1)$ and so on, where $\xi(k)$ denotes a discrete time series evaluated at time k. If the forward path outputs (starting from the top) of the right hand ganglion in FIG. 7 are labeled, $y_1$, $y_2$, $y_3$ and $y_4$ then, $$\begin{pmatrix} y_1 \\ y_2 \\ y_3 \\ y_4 \end{pmatrix} = \begin{bmatrix} W_{11} & W_{12} & W_{13} & W_{14} \\ 0 & W_{22} & W_{23} & W_{24} \\ 0 & 0 & W_{33} & W_{34} \\ 0 & 0 & 0 & W_{44} \end{bmatrix} \begin{pmatrix} \xi(k) \\ \xi(k-1) \\ \xi(k-2) \\ \xi(k-3) \end{pmatrix}$$

This has the form of an input-output relation for a linear Finite Impulse Response (FIR) system. $y_1$, could be interpreted as the present (time k) response of such a system—call the present response y(k). $Y_2$ is seen to be an approximation (exact if $W_{14}=0$) to the response of a FIR system one step in the past—call it y(k-1), etc. Thus $(Y_1, Y_2, Y_3, Y_4)$ can be viewed as an approximation to (y(k),y(k-1),y(k-2), y(k-3)). Obviously this is possible only because the subdiagonal entries of the weight matrix are zero—otherwise $\xi(k)$ could influence y(k-3), for example. Also the above illustrates how a neural system that is equipped to address static, pattern classification problems can also be applied to dynamic processes. Basically, time varying signals are put through tapped delay lines to produce inputs to the network that are patterns representing the time histories of the input signal. The network output is an array of ganglion outputs constituting a pattern representing the time history of the output signals of a dynamic system. Thus a dynamic system is simply a rule for transforming an input pattern (time history) into an output pattern (time history). The structural constraints involved in the definitions of ganglia and Toeplitz synapses permit the network to arrive at physically meaningful (causal) transformations.

Figure 7B:
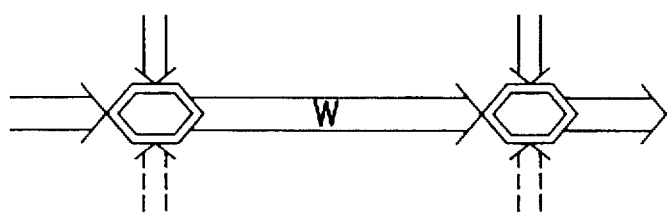
FIG. 7B shows the block diagram conventions for the devices shown in FIG. 7A.

With reference to FIG. 7B the ganglia and synaptic connections may be simply diagrammed as shown. As indicated, ganglia are represented by double-lined hexagon symbols. Toeplitz synapses are indicated by double arrows with the associated weight matrix shown within the arrow. If two or more Toeplitz synapse arrows converge on the input to a ganglion, the input is the sum of the indicated symbols. As before, only the forward path signal flows are shown explicitly.

Any network formed by an arbitrary number of ganglia, linked by Toeplitz synapses in any arbitrary pattern (series connections, parallel, close-loops or combinations thereof) is referenced to herein as a Toeplitz network. The two top levels of the hierarchy in FIG. 3 are examples of Toeplitz networks, assuming Toeplitz synapses are being used.

Figure 8:
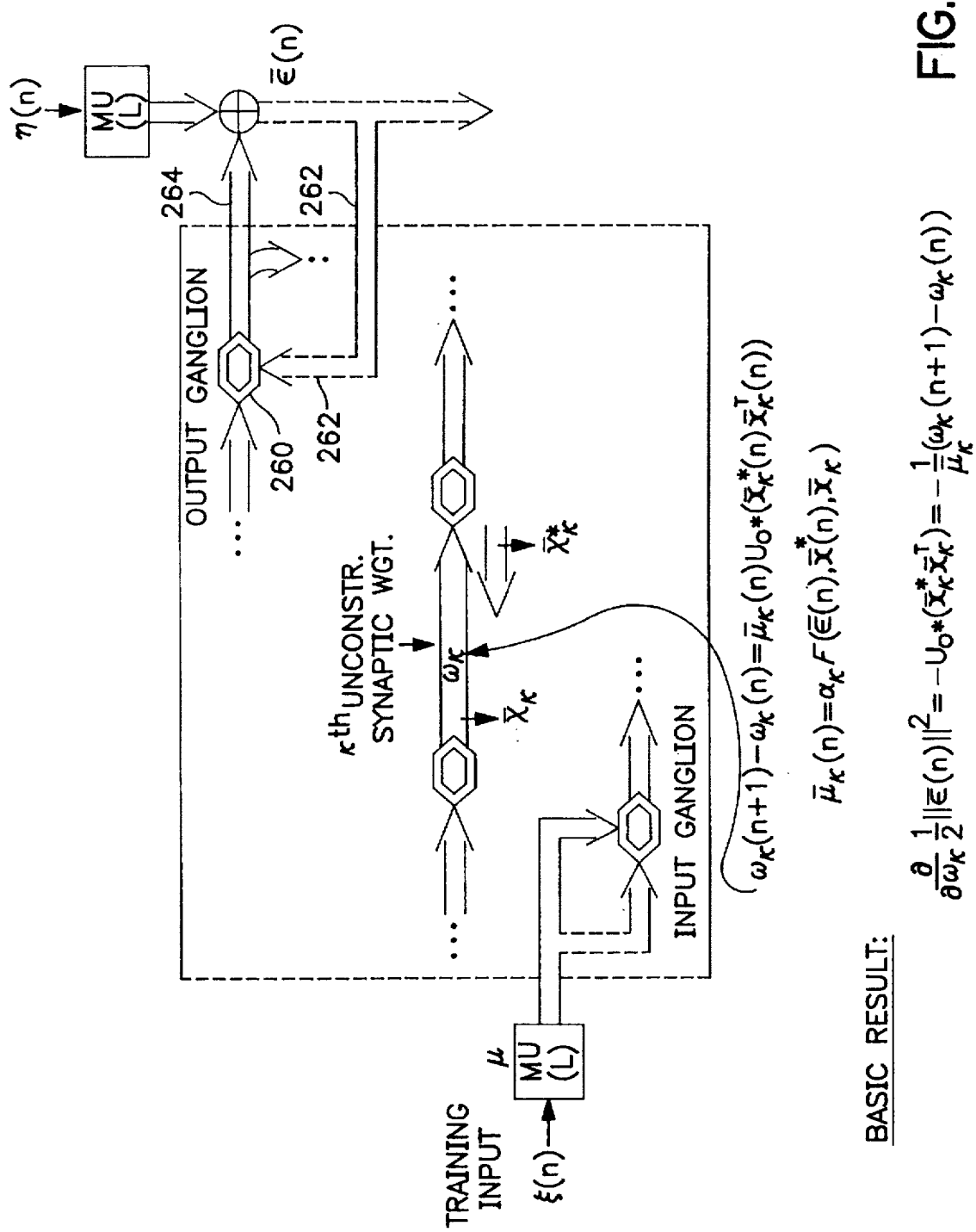
FIG. 8 is a simplified block diagram illustrating a typical arrangement for a Toeplitz network according to the invention.

A typical configuration for a Toeplitz network in accordance with the present invention is depicted in FIG. 8. An externally provided training signal, $\xi$ is first passed through a memory unit $\mu$, so that $\xi$ is the basic input to the network. The output 264 of some designated ganglion 260 constitutes the output of the overall network and this vector is compared with a reference signal $\bar{\eta}(n)$ obtained by passing a reference signal $\eta(n)$ through a memory unit. $\eta(n)$ might be the output of some dynamic system with $\xi$ as input. The difference, $\bar{\epsilon}(n)$, is then injected into the backward signal path 262 of the output ganglion.

The bottom of FIG. 8 states a fundamental gradient descent result for the Toeplitz network. For each weight matrix, $w_k(n+1)-w_k(n)$ is precisely equal to $\bar{\mu}_k$ multiplied by minus the gradient of the mean-square error, $\frac{1}{2}\|\bar{\epsilon}(n)\|^2$. Thus, the Toeplitz network is essentially a gradient descent machine—i.e. $w_k$ changes in the direction of the negative gradient of $\frac{1}{2}\|\bar{\epsilon}(n)\|^2$ with respect to $w_k$.

The formula for the weight matrix update given in FIG. 8 is a direct consequence of the definitions given in FIGS. 4A, 5A and 7A. Here * denotes the Hadamard product of matrices (element-by-element multiplication). $U_0$, is a particular instance of a synaptic constraint matrix. In the following, $U_n$ denotes the matrix:

$$U_n \in \mathbb{R}^{L \times L}$$

$$(U_n)_{kj} = \begin{cases} 0; & j < k+n \\ 1; & j \geq k+n \end{cases}$$

Furthermore, the symbols $\hat{g}(\cdot)$ and $g'(\cdot)$ denote:

$$\hat{g}(\bar{x}) \in \mathbb{R}^L; (\hat{g}(\bar{x}))_\kappa \triangleq g(\bar{x}_\kappa)$$

$$\hat{g}'(u) \in \mathbb{R}^{L \times L}; \hat{g}(u) \triangleq \underset{\kappa=1\ldots L}{diag}\{g'(u_\kappa)\}$$

where g is the sigmoidal nonlinearity of the neurons (see FIG. 4) and g' is its derivative.

In some circumstances involving the identification or control of linear, time-invariant systems, it is desirable to constrain the Toeplitz synapse still further because this reduces the number of network parameters to be adapted and speeds up convergence. For linear, time invariant applications, it is desirable to constrain a Toeplitz synapse to be a strictly Toeplitz synapse—i.e. one for which the weight matrix has the form:

$$w = M \uparrow \begin{bmatrix} w_1 & w_2 & \ldots & w_N & 0 & \ldots & 0 \\ 0 & w_1 & \ldots & w_{N-1} & w_N & \ldots & 0 \\ \cdot & \cdot & \cdot & & & \cdot & \\ \cdot & \cdot & \cdot & & & \cdot & \\ \cdot & \cdot & \cdot & & & \cdot & \\ 0 & 0 & \ldots & w_1 & w_2 & \ldots & w_N \end{bmatrix} \overset{-M+N-1-}{}$$

—i.e. the elements within the diagonal or any super-diagonal are equal. With $|W_1, W_2, W_N|^T = W \in \mathbb{R}^N$, define Toep [W] as the matrix of the above form formed from the elements of vector W. Thus, $$w = Toep[W] \in \mathbb{R}^{M \times (M+N-1)}; W \in \mathbb{R}^N$$

With w given as above, the input-output relations for both the forward and backward paths remain as before. However, under the strict Toeplitz constraint, the weight matrix update relation is modified. To provide notation to describe this modification, let $\Gamma \in \mathbb{R}^{M \times M+N-1}$ and let $avd\ [\Gamma] \in \mathbb{R}^N$ denote the vector whose $k^{th}$ element is:

$$(avd[\Gamma])_\kappa \triangleq \frac{1}{M} \sum_{i=1}^{M} \Gamma_{i,\kappa+i-1}; \kappa = 1, \ldots, N$$

Then with w constrained to equal Toep [W], the proper formula for updating w is $$w(n+1) = Toep[W(n+1)]$$

$$W(n+1) - W(n) = \bar{\mu}(n)\ avd[\bar{X} = \bar{x}^T]$$

where $\bar{x}$ is the vector of forward path inputs to the synaptic bundle and $\bar{X}^*$ is the vector of backward path inputs. Note that, to some extent, the above formula involves non-local computations (linking the inputs or outputs of several synapses). However, this is counterbalanced by somewhat faster convergence for linear, time-invariant problems.

In gradient descent schemes, instability in the form of oscillatory divergence can result if the adaptive speeds are too large. In the system of the present invention, $\mu_k(n)$ can be updated in a manner in which such instability is avoided. Referring to FIG. 8, $\Im(\bar{\epsilon}, \bar{x}_k, \bar{x}_k)$ provides a scaling of $\hat{\mu}$ such that stability and convergence requirements are reduced to restrictions on the real positive constant termed the learning rate constant $\alpha$. This is a "universal" constant in that it may be chosen once and for all (and built into the system) so as to secure desired convergence rates independently of detailed characteristics of training stimuli or of the systems to be identified and controlled. This gives the benefit of stable, autonomous performance.

Figure 9A:
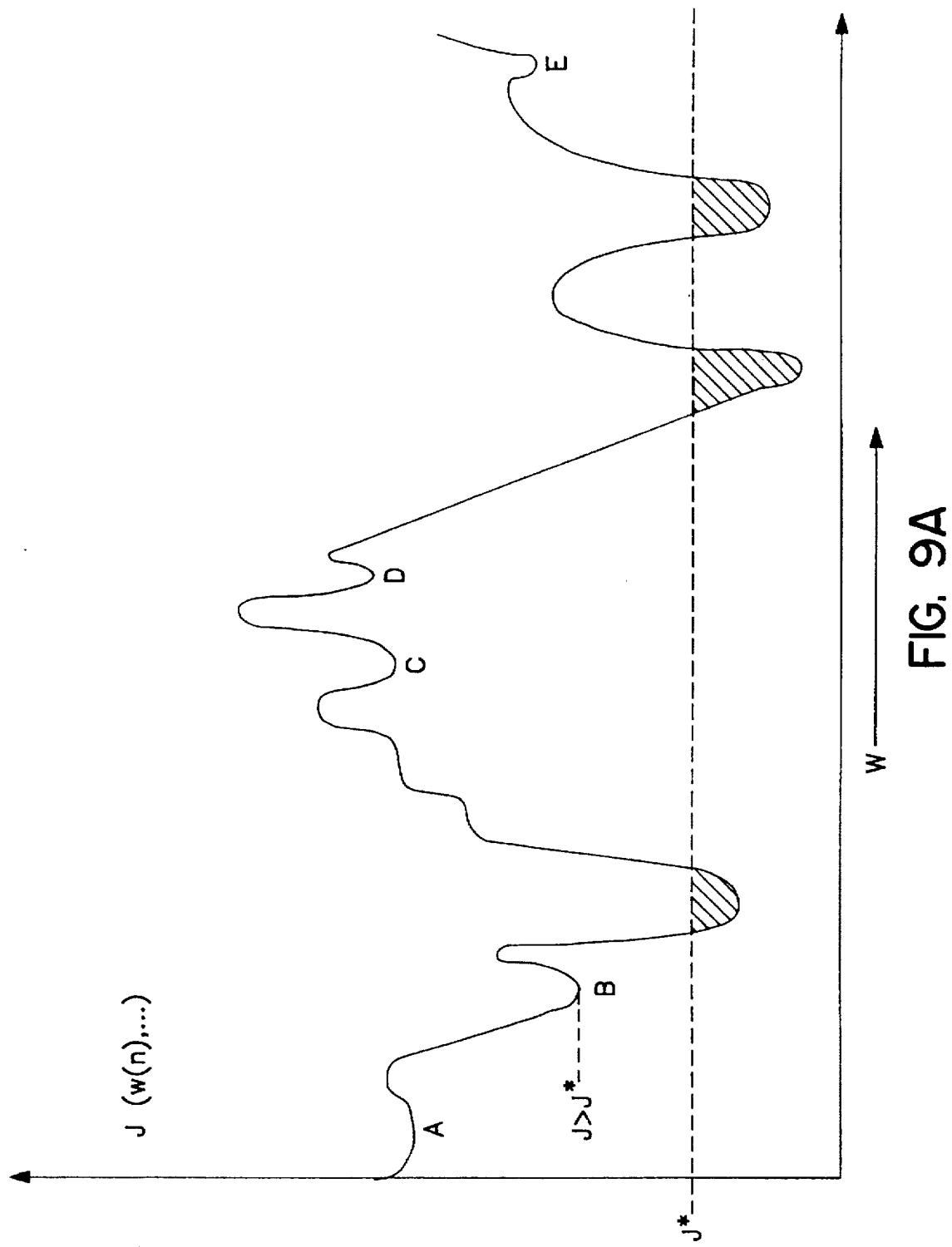
FIG. 9A illustrates convergence behavior of the invention when the performance function has several local minima.

With reference to FIG. 9, the inventions have found that the adaptive speed function, $\Im(\bar{\epsilon}, \bar{X}_k, \bar{x}_k, k=1 \ldots N)$ shown in FIG. 9 provides desirable results. The numerator and denominator of $\Im$ are derived from readily accessible signals. The numerator, $P^2$, signifies the performance requirement in terms of the mean square output error, $\frac{1}{2}\|\bar{\epsilon}(n)\|^2$. Note that by virtue of the function chosen, the system does not need to achieve a minimum value of $\frac{1}{2}\|\bar{\epsilon}(n)\|^2$ but only to achieve a value that falls below a desired level. J*. Thus, the network attempts to achieve "good-enough performance," not necessarily optimal performance.

The Toeplitz network will converge simply by estimating a lower bound to the degree of homogeneity M of the performance function $\frac{1}{2}\|\bar{\epsilon}(n)\|^2$ (that is, a bound on the number M such that the performance function is bounded by a homogeneous function of degree M of the weights) and setting the learning rate constant, once and for all, to a number less than twice this lower bound. This simple procedure is all that is needed to ensure that the network of FIG. 8 will adapt so as to match the desired output, $\eta(n)$ to the desired accuracy. In the majority of identification problems, M is 2 (the performance function is quadratic). In such cases $\alpha < 4$ assures global convergence (independent of starting conditions). In the majority of control problems, M is locally 2—i.e. $\alpha < 4$ gives convergence with reasonable choices for starting conditions. Numerical simulations and laboratory experience indicates that $\alpha = M$ is the optimum choice because convergence is as fast as possible and involves minimal oscillation of the synaptic weight values.

In certain general nonlinear problems, the function $\oint$ (W(n)) (which denotes $\frac{1}{2}\|\bar{\epsilon}(n)\|^2$ as a function of all the weights) is not globally convex—i.e. has several local minima rather than a single global minimum. This situation is illustrated schematically in FIG. 9A where W denotes a vector formed from all of the independent synaptic weights. Neural networks heretofore used to solve optimization problems generally experience the difficulty that their solution can be trapped in one of the high lying local minima—i.e. points A, B, C, D or E in FIG. 9A—thus failing to achieve satisfactory performance (that is: failing to converge to minima that lie below the acceptable performance tolerance, J* in FIG. 9A). The system disclosed herein, however, exhibits quite different behavior. Because of the particular structure of the adaptive speed function in FIG. 9, high lying minima (points A-E) are unstable. In other words, if the weights, W, are initially in the vicinity of point C for example, the system executes ever larger departures from C. Within finite time the network leaves the "valley" having point C as its bottom and ultimately enters one of the "valleys" associated with minima below J*. Once this occurs (and assuming $\alpha < 2M$ for each of these low-lying valleys), the system converges to a value of W within the low-lying valley and the final performance, $\cancel{J}$ is less than J*. This feature makes the disclosed system very attractive for applications involving complex nonlinear optimization problems that have numerous local minima.

With reference again to FIG. 3, replicator units are composed of several ganglia and represent the simplest functional (from the point of view of applications) examples of Toeplitz networks. The fundamental task of the replicator is to duplicate the output of a previously unknown sampled-data dynamic system when both replicator and system are stimulated by the same training signal. Several forms of replicator are available depending on whether the system to be replicated is known to be linear or non-linear or is FIR (finite impulse response) or IIR (infinite impulse response).

Figure 10:
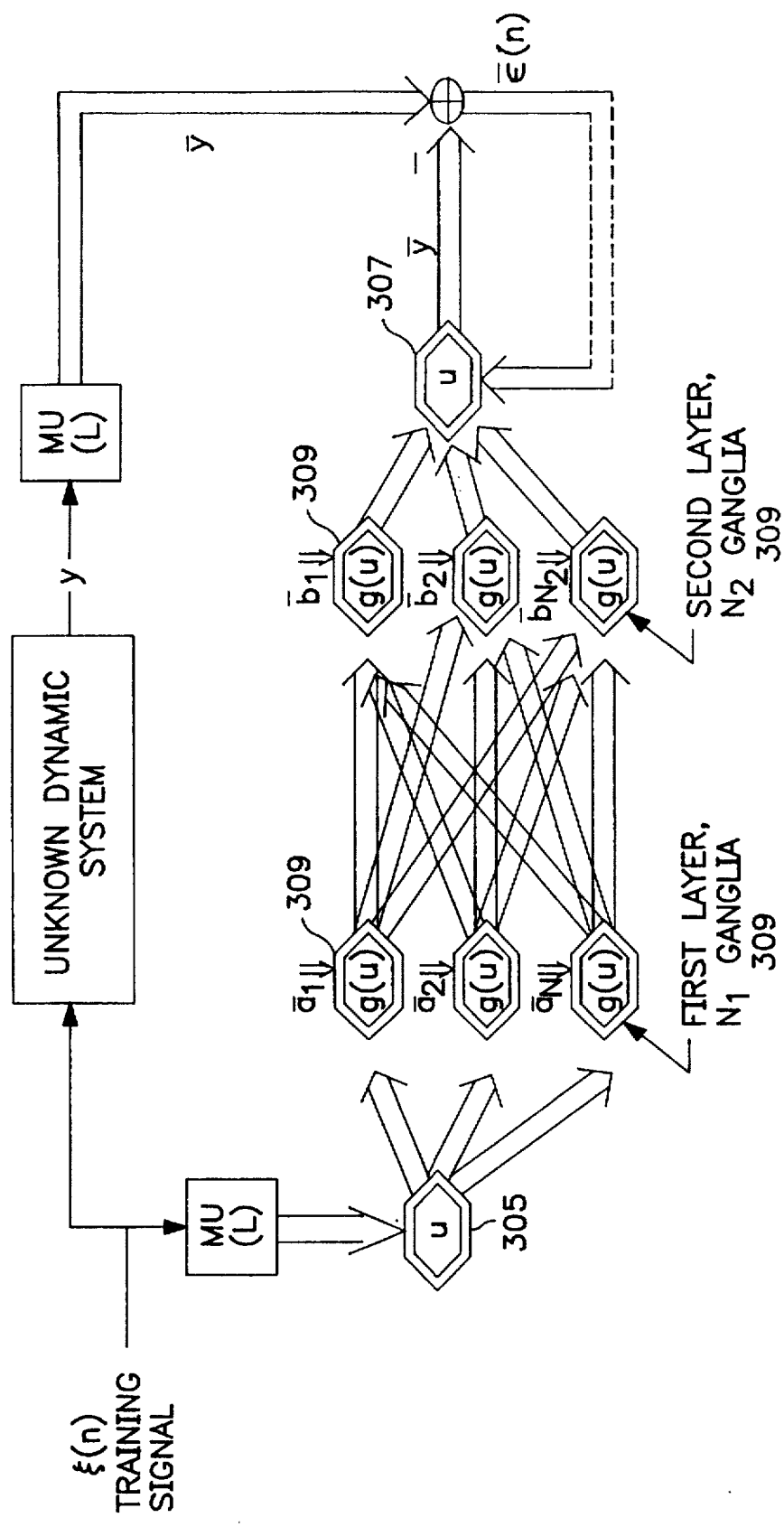
FIG. 10 is a simplified block diagram showing neural replicator for a nonlinear FIR system according to the invention.

With reference to FIG. 10, the arrangement is shown in FIG. 10 for replicating a nonlinear FIR system, for which the output, y(n), has the form $$y(n) = \Im(\xi(n), \xi(n-1), \ldots \xi(n-L+1))$$

where (•) is some unknown function of the several arguments. This replicator has a linear input ganglion 305 (i.e. the constituent neurons have a linear activation function g(x)=x), a linear output ganglion 307 and one or more hidden layers of nonlinear ganglia 309 (where two hidden layers are shown in the figure for illustrative purposes). From approximation theory results established for networks applied to static mapping problems (see L. Fausett, *Fundamentals of Neural Networks*, Prentice Hall, Englewood Cliffs, N.J., 1994), it can be deduced that with only a single layer and given sufficiently many hidden layer ganglia, any continuous function (. . . . . . .) can be approximated by the network to within any specified error tolerance. The network of FIG. 10 is readily generalized to multi-variable systems and IIR (infinite impulse response) systems.

Figure 11:
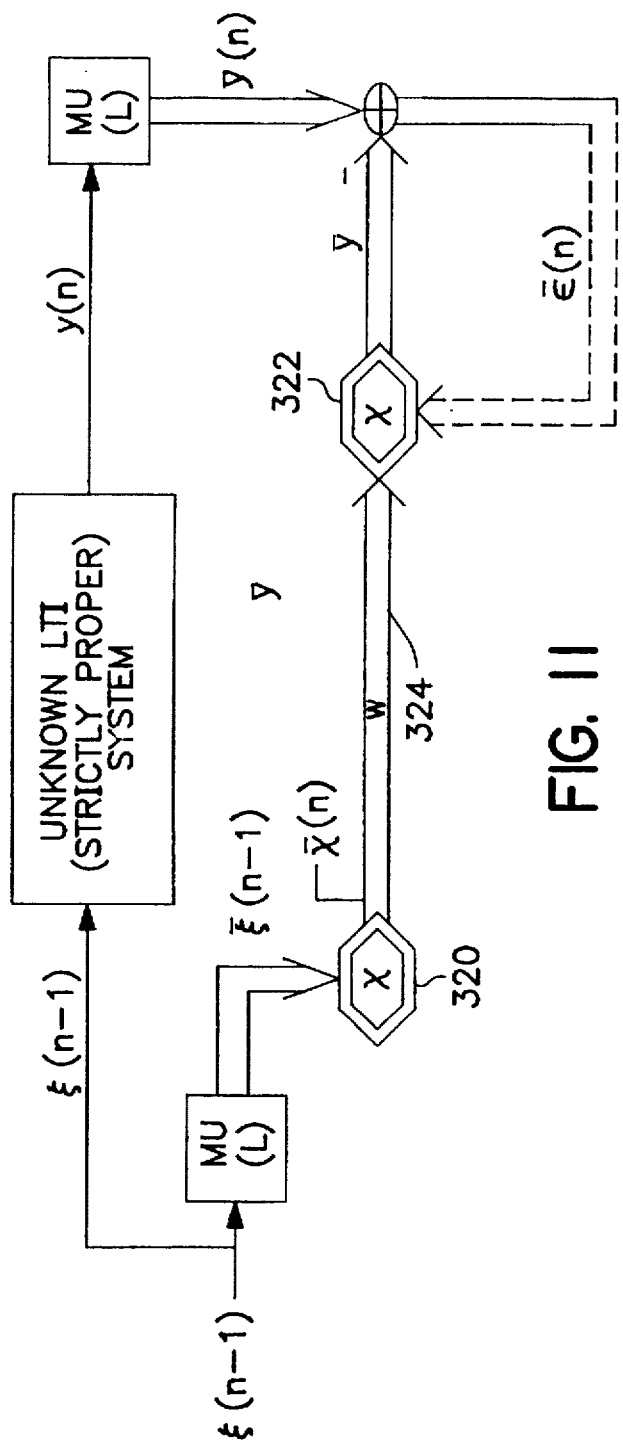
FIG. 11 is a simplified block diagram for a neural replicator for a linear FIR system, according to the invention.

For linear FIR systems the structure of the network needed for replication is even simpler as shown in FIG. 11. A linear input ganglion 320 and a linear output ganglion 322 are connected via a single Toeplitz synapse 324. This system can duplicate (after training) the output of a system defined by the impulse response formula:

$$y(n) = \sum_{l=1}^{L} h_l \xi(n-l)$$

where $h_l = 1, \ldots, L$, are the "Markov parameters".

For linear IIR systems the network of FIG. 11 would not always be suitable because a large number of neurons would be required to approximate an IIR system with the above FIR model. Replicators for IIR linear systems, therefore, may be based on other types of input-output models. Possible alternate IIR model forms are:

ARMA (Autoregressive Moving Average)

$$y(n) = \sum_{l=1}^{M} \alpha_l y(n-l) + \sum_{l=1}^{M} \beta_l \xi(n-l)$$

ARMarkov $$y(n) = \sum_{l=1}^{M} \rho_l y(n-L-l) + \sum_{l=1}^{M+L} \mathcal{L}_l \xi(n-l)$$

Note:

(1) The first L $\mathcal{L}_l$ are the Markov parameters $h_l, \ldots, h_L$
(2) L=0 gives the ARMA model
(3) In the limit L→∞, the "remainder"

$$\sum_{l} \rho_l y(n-L-l)$$

vanishes for a stable system, therefore ARMarkov→impulse response

Batch ARMarkov $$\bar{y}(n) = Toep[\bar{\rho}|\bar{y}(n-1) + Toep[\bar{\mathcal{L}}]\bar{\xi}(n-1)$$

where $$\bar{y}(n) = \begin{pmatrix} y(n) \\ \cdot \\ \cdot \\ y(n-R+1) \end{pmatrix}, \bar{\bar{y}}(n) \triangleq \begin{pmatrix} y(n-L-1) \\ \cdot \\ \cdot \\ y(n-L-M-R+1) \end{pmatrix},$$

$$\bar{\xi}(n-1) \triangleq \begin{pmatrix} \xi(n-1) \\ \cdot \\ \cdot \\ \xi(n-L-M-R+1) \end{pmatrix}$$

Generally, the ARMA model is more suitable for IIR systems in that only a finite number of parameters are needed to describe an IIR system. However, neural nets fashioned along the lines of ARMA models tend to mistake the stability properties of the system, i.e., very slight errors in the ARMA coefficients can produce an unstable model for a stable system (especially if damping is very small). This is because ARMA coefficients do not capture the behavior of the impulse response.

The ARMarkov model given above is the preferred model form. The "ARMarkov" model blends the impulse response (Markov parameters) and ARMA models. The ARMA model gives a prediction of y(n) given the immediate past values of $\xi$ and y, the ARMarkov model predicts y(n) given past values of μ and the distant past values of y, starting with y (n-L-1). As noted, L=0 yields an ARMA model. With L>0, the coefficients $\mathcal{L}_1, \ldots, \mathcal{L}_l$ are the Markov Parameters. Further, in the limit, L→∞, it can be shown that for a stable system, the "remainder" term vanishes and the ARMarkov model reverts to the impulse response. These various properties allow the construction of neural networks that do not have the stability problems of ARMA models discussed above.

The Batch ARMarkov model may also be utilized because of its importance in closed-loop identification and in adaptive neural control. This is derived directly from the ARMarkov model merely by writing an expression for y(k−1), appending the results to the original equation to obtain $$\begin{pmatrix} y(k) \\ y(k-1) \end{pmatrix},$$

then repeating this process R−1 times to obtain an equation that predicts a "recent past vector," $\bar{y}(k)$, of the output given the past history, $\underline{\xi}$ of $\xi$, and the distant past history, $\bar{y}(k-1)$, of y. This process produces a model in which the coefficient matrices are simply Toeplitz matrices defined by the coefficients $\rho_1, \ldots, \rho_M$ and $\mathcal{L}_1, \ldots, \mathcal{L}_M$ in the ARMarkov model.

When a neural network is used to "identify a system," a two step process is generally used in which the network is first trained to replicate the input-output relations of the unknown system and, secondly, the network makes available for further utilization an external intellectual representation of its contents (in the form of a model type and associated numerical coefficients). A "replicator" is only required to perform the first step. However, whenever the replicator embodies a specific model type the second step above is usually straightforward once the first step is accomplished. Moreover it is possible to use Toeplitz networks to transform one model type into another, as desired. Thus, in the following the "identifier" task is effectively completed once the neural network convergence to the plant input-output behavior is established.

There are two main schemes for training networks to accomplish identification in the above sense for IIR systems. The first is most commonly termed the parallel model scheme. An ARMarkov based replicator network for executing this scheme is shown in FIG. 12.

Figure 12:
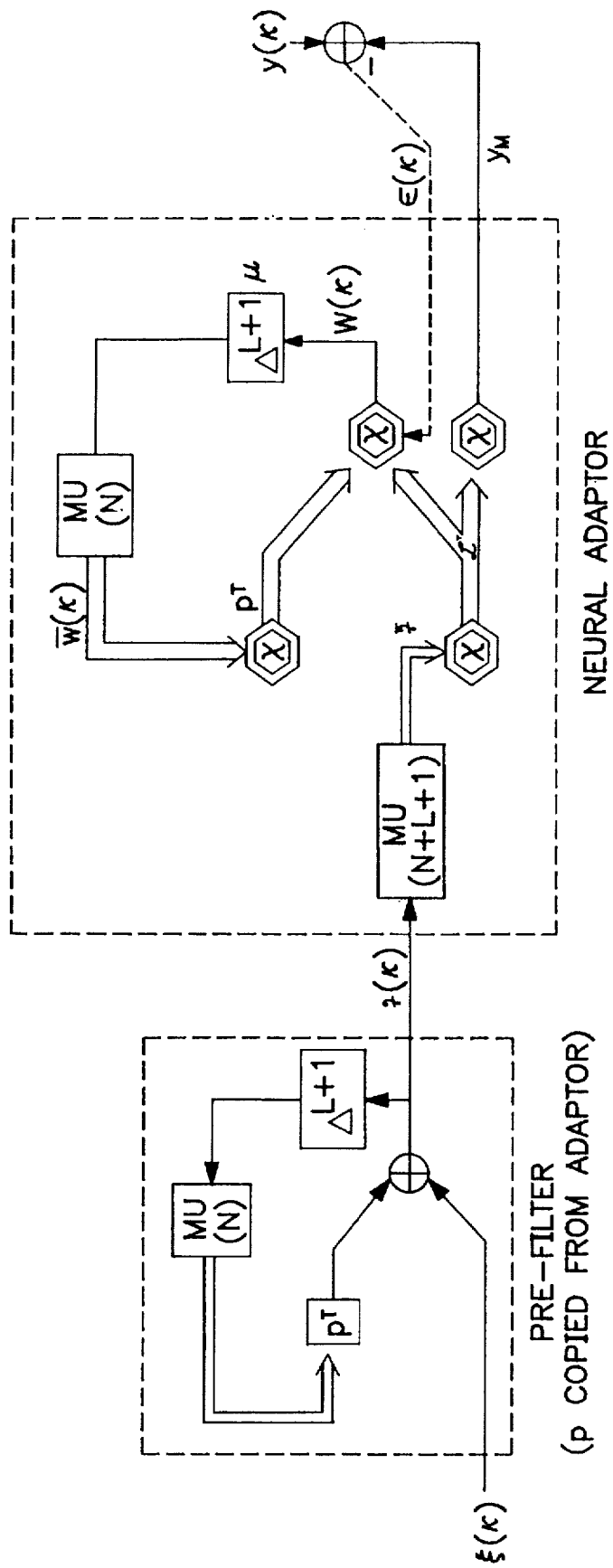
FIG. 12 is a simplified block diagram for an ARMarkov replicator, according to the invention, which operates in accordance with the parallel model approach to system identification.

With reference to FIG. 12, both a plant and a neural identifier are subjected to the training input $\xi$ and the difference between their outputs is used to adjust the synaptic weights. As shown in FIG. 12, the network has a structure that is in one-to-one correspondence to an ARMarkov model of the plant. In particular the network contains time delays μ on its output and this delayed output is fed back in a manner that is analogous to the arrangement within an ARMarkov model of the plant. Generally, the parallel model scheme proves to have some difficulties. In general, although convergent adaptive laws are known for simple open-loop identification, useful generalizations capable of closed-loop identification are not available. Moreover, parallel model, gradient-based identification schemes exhibit heightened sensitivity to stability properties and cannot be guaranteed to converge globally.

Figure 13A:
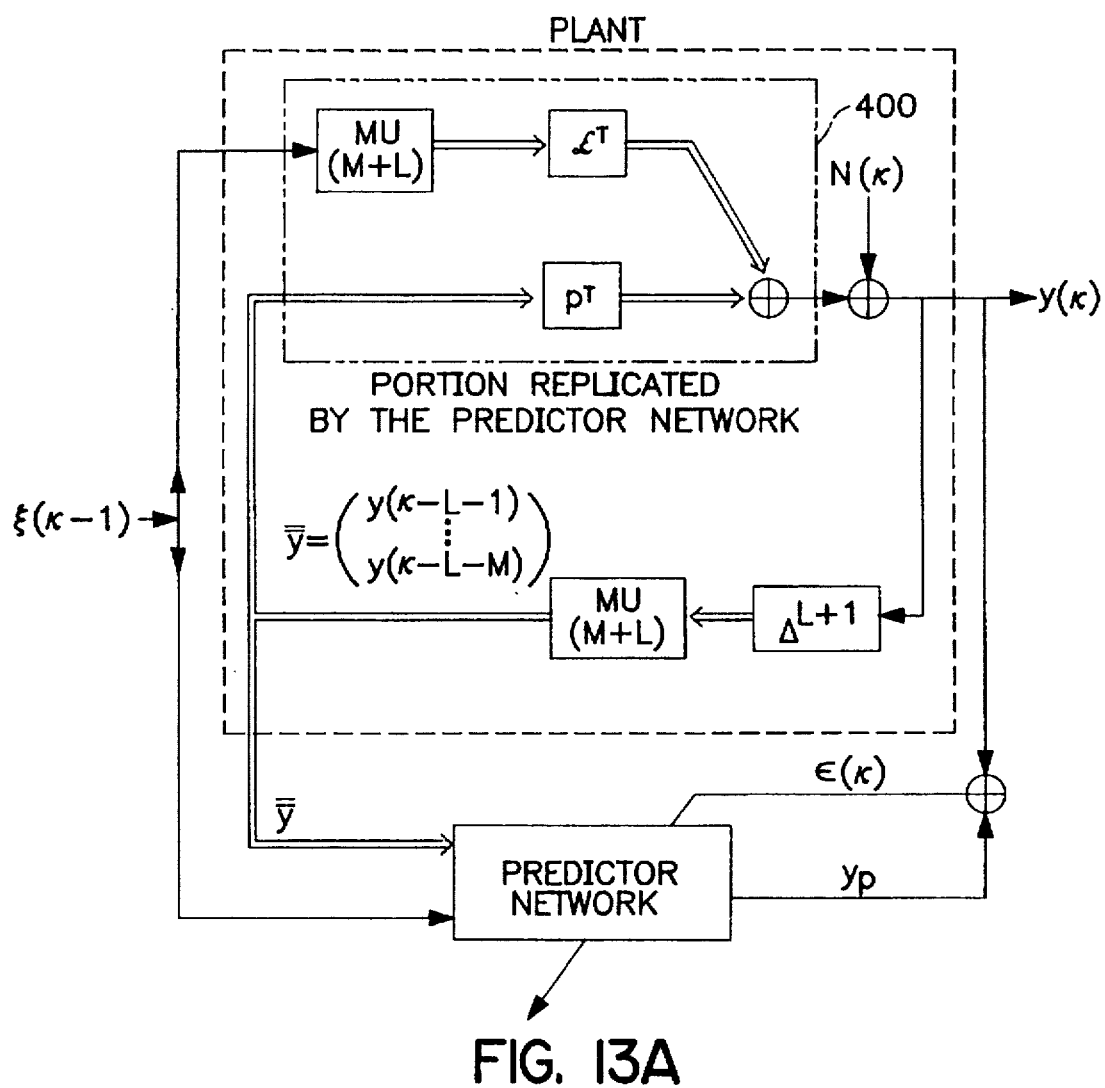
FIG. 13A is a simplified block diagram illustrating a series—parallel model approach to system identification when the replicator is operating in the training mode.

In contrast, the second scheme, although it involves apparently subtle modification of the parallel model approach, achieves great simplicity and effectiveness. This approach is the series parallel model approach, or as it is termed here the predictor network scheme and is depicted in FIG. 13. In this scheme, one imagines that the "plant" to be identified is the small sub-block 400 shown in FIG. 13A which has $\xi$ and the delayed history vector of the output, $\bar{y}$, as inputs. With this setup, only the static mappings $\mathcal{L}^T$ and $\rho_T$ need to be replicated in the net and this is easily done by backpropagating the output error ϵ(k) and using the weight update relations given above. Another way to understand this scheme is to visualize the plant as a predictor— i.e., a device that outputs the present response y(k), given as inputs the past values of the training stimulus and the response output. When the plant is viewed in this way, it is perfectly reasonable to construct a neural identifier having the same predictor structure with $\xi$ and y+ee as inputs.

Figure 13B:
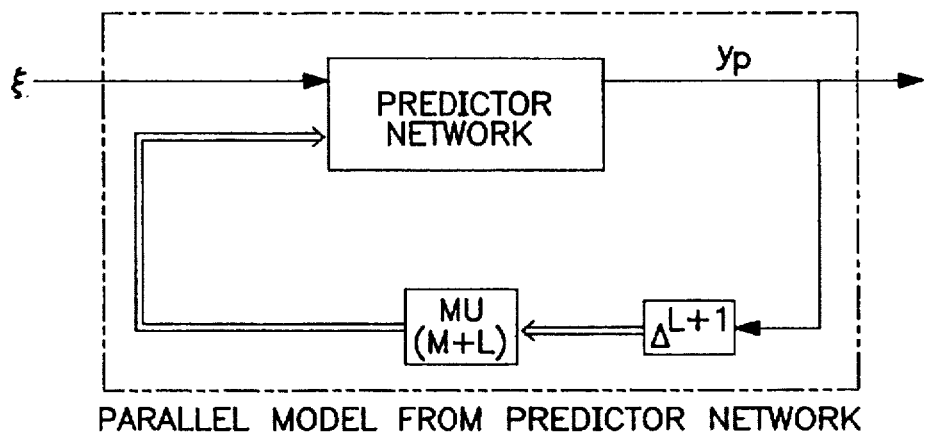
FIG. 13B is a simplified block diagram showing a series—parallel replicator in the operational mode.

FIG. 13A shows only the training configuration. Once training is complete, a predictor network can be used as a standalone, parallel model merely by delaying the output and feeding it back to the input as shown in FIG. 13B. Thus the original objectives of the parallel model scheme can be met.

As noted previously, the system of the present invention may also use various replicators based on the ARMarkov and batch-ARMarkov models using the series-parallel identification approach.

Figure 14:
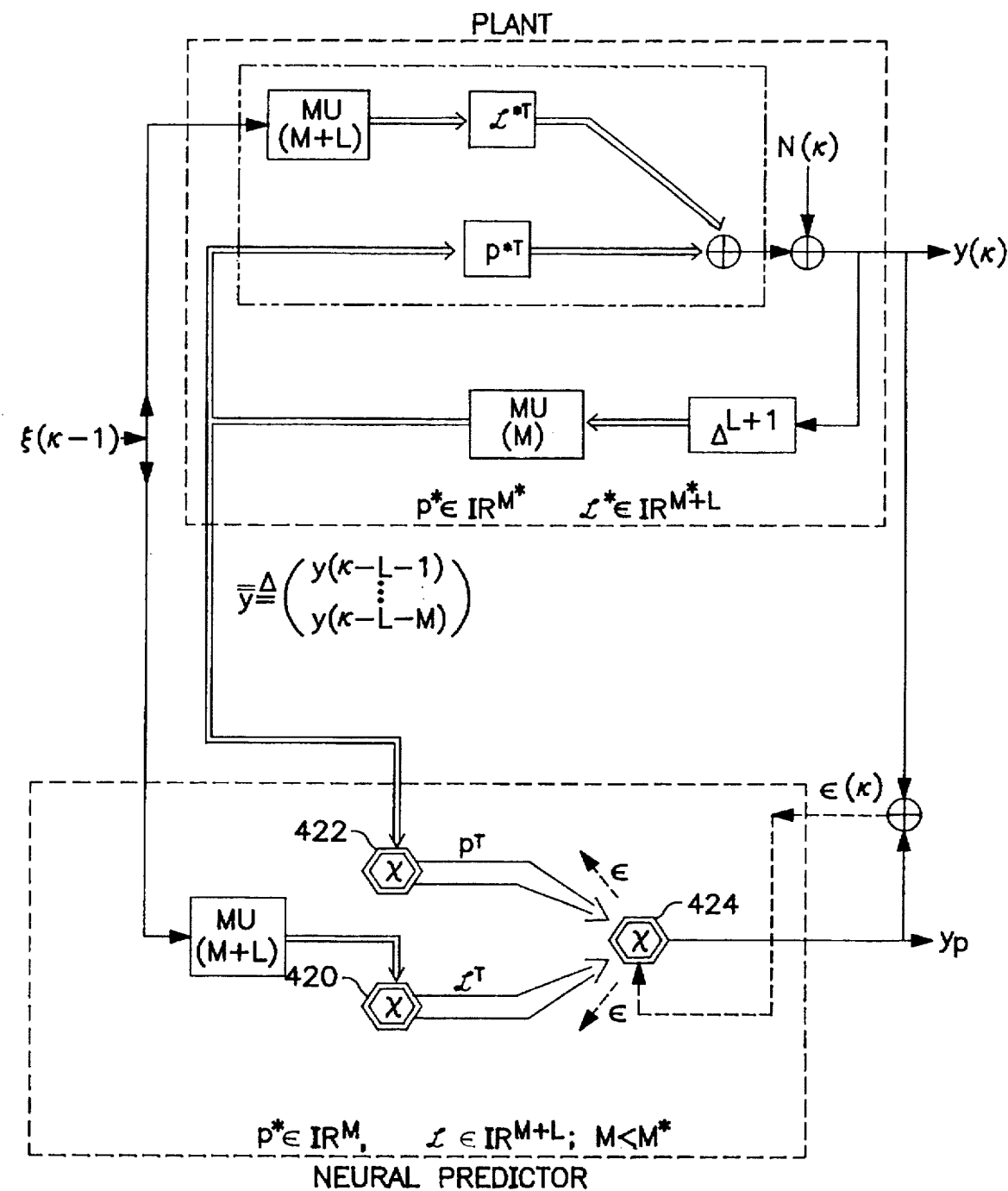
FIG. 14 is a simplified block diagram of a series—parallel, ARMarkov replicator according to the invention.

With reference to FIG. 14, if we visualize the plant as an ARMarkov model as shown at the top of FIG. 14 and apply the basic principles of the neural architecture reviewed above, the neural predictor network is as shown at the bottom of FIG. 14. Two linear input ganglia 420, 422 accept $(\xi(k-1), \ldots, (k-M-L))^T$ and $\bar{y} = (y(k-L-1), \ldots, y(k-L-M))^T$ as forward path bias inputs, then two Toeplitz synapses sum into a linear output ganglion 424. Since the output is scalar, the Toeplitz synaptic weights are represented by M-dimensional column vectors. Assuming that M≦M* where M* is the dimension of the plant, there exist numerical values $\rho$ and $\mathcal{L}$ such that exact replication of the plant can be achieved.

Because of the series-parallel identification approach, it is easily seen that $\|\epsilon\|^2$ is a quadratic function of the weights. Thus, since the degree of homogeneity is 2, a learning rate constant <4 guarantees global stability and convergence of the network.

With continued reference to FIG. 14, N represents inescapable noise arising from physical sensors and instrumentation and is an irreducible obstacle to perfectly accurate identification. One important feature of any automated system identification process is how insensitive it is to such instrumentation noise—i.e. how large are the errors it produces as a result of the output noise. Even in the steady-state there are two types of errors coexisting: bias, which is a nonzero, constant deviation of the time averaged values of $\rho$ and $\mathcal{L}$ from desired values and fluctuation, which denotes the unsteady dithering of $\rho$ and $\mathcal{L}$ about their mean values. Both types of errors have been studied theoretically and experimentally for ARMarkov-based replicators (L>0) versus ARMA-based replicators (L=0). It has been shown that if L, the delay parameter in the ARMarkov network is chosen sufficiently large that y (k−L−1) is uncorrelated with N(k) then the bias component of the errors vanish. This shows the advantage of the ARMarkov model over an ARMA model in the presence of plant disturbance and observation noise. With an ARMA model (L=0), bias error is inevitable except in the idealized case that N(k) is white noise. But with an ARMarkov based system, bias error can be reduced to arbitrarily small levels by choosing L sufficiently large.

Further, the ARMarkov-based system also mitigates the fluctuation component of the errors, but does not entirely eliminate them.

Figure 15:
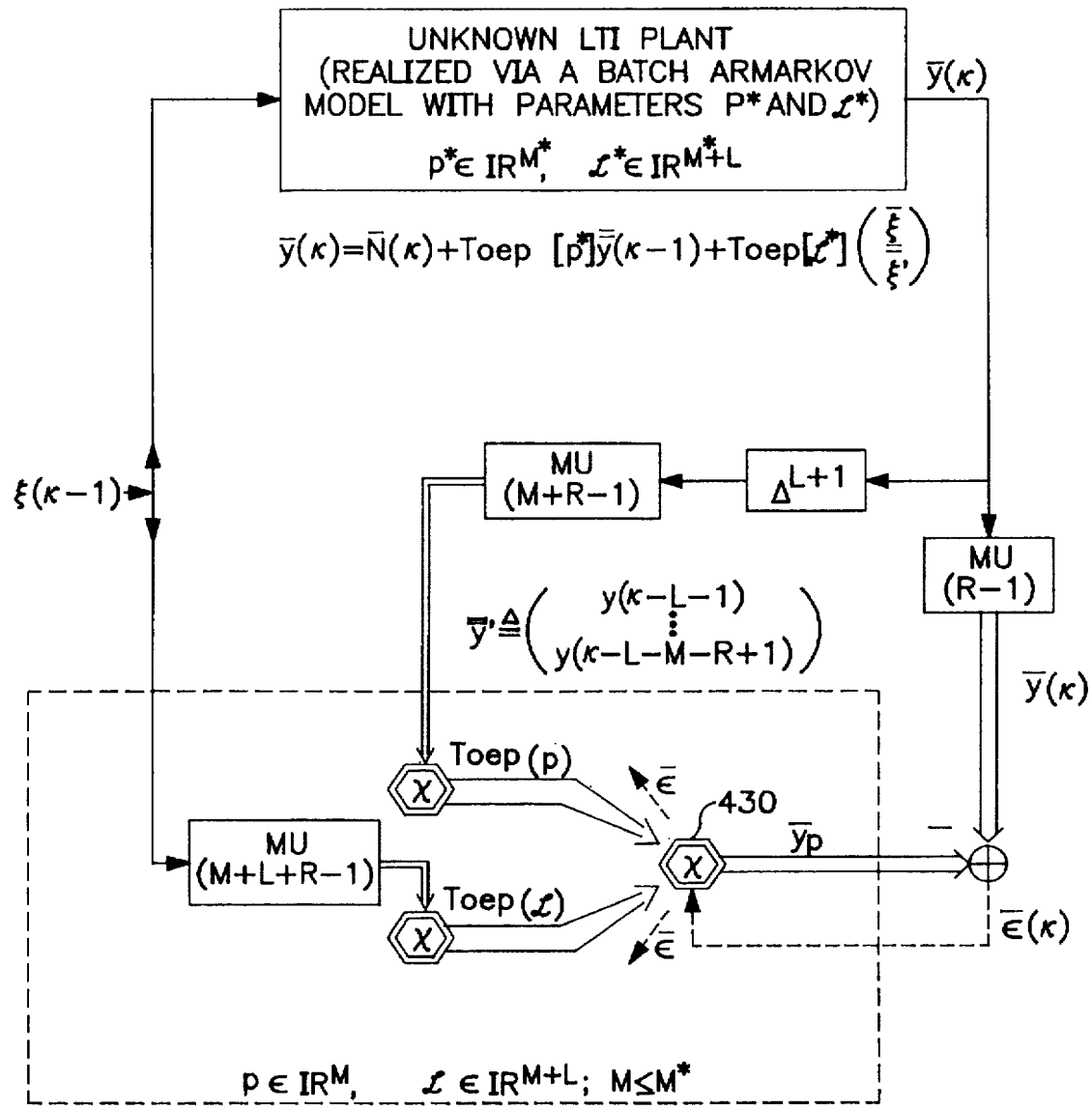
FIG. 15 is a simplified block diagram of a series—parallel, batch ARMarkov replicator according to the invention.

With reference now to FIG. 15, the plant may be considered as a Batch ARMarkov model and the neural predictor network may be structured accordingly. This is the same fundamental structure as in the ARMarkov model of FIG. 14 except that there are multiple layers of output neurons so that the predictor's output is an R-dimensional history vector. The R-dimensional error vector $\bar{\epsilon}(k)$, is then fed back into the output ganglion 430

Guaranteed stability and convergence properties are the same for both ARMarkov model as for the ARMarkov-based system. Also, as in the previous case, the bias components of error vanish for sufficiently large L. In addition, however, if R, the number of neural layers in the Batch ARMarkov neural replicator can be chosen sufficiently large, the fluctuation error can be made arbitrarily small. Thus, in summary, ARMarkov and Batch ARMarkov replicators exhibit superior resistance to instrumentation noise and improved identification accuracy.

Figure 16:
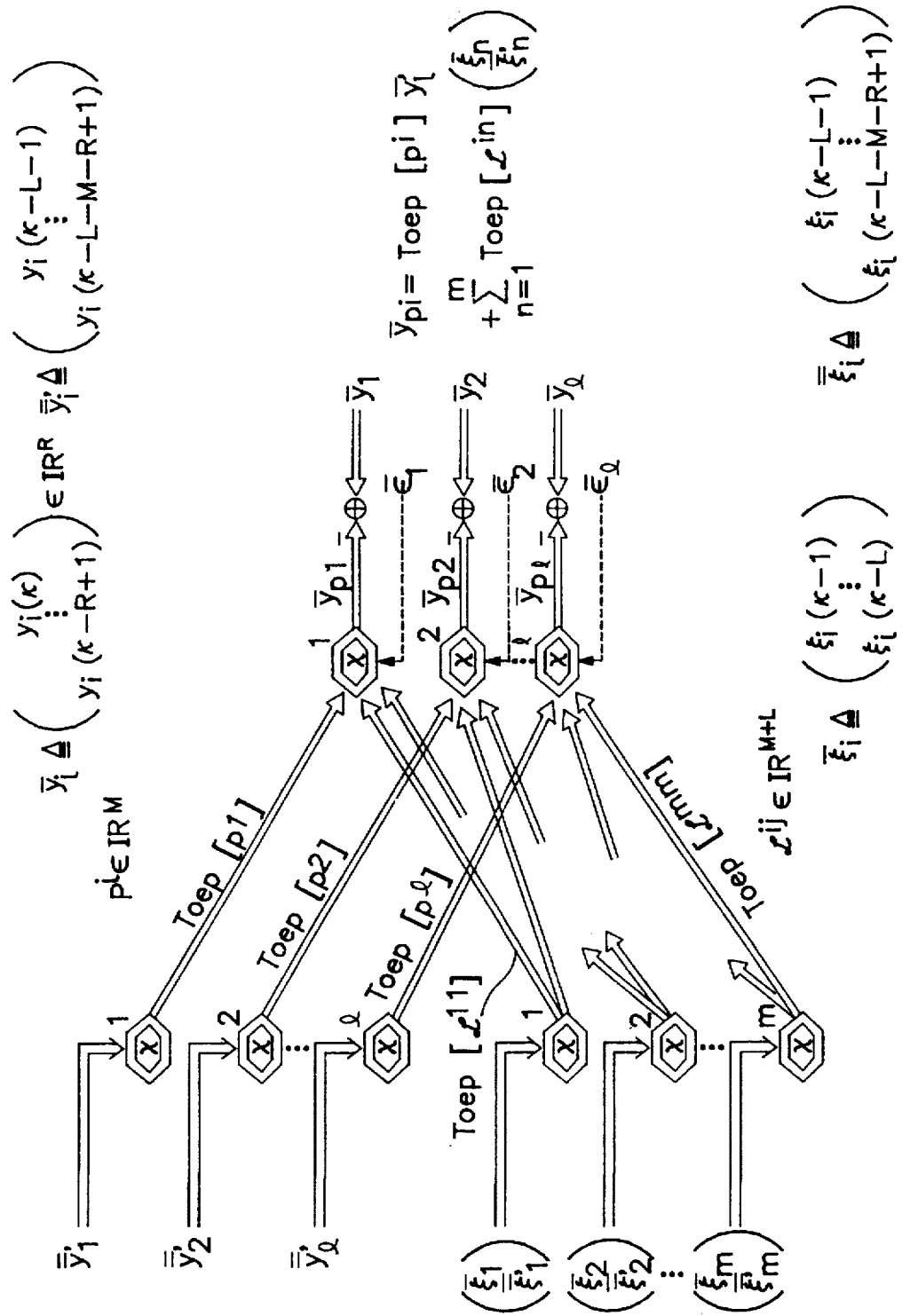
FIG. 16 is a simplified block diagram illustrating the extension of the batch ARMarkov replicator to multi-input multi-output systems according to the invention.

The above replicator types can be extended to nonlinear systems and to multi-input, multi-output (MIMO) situations. For example, FIG. 16 shows a replicator based on a MIMO, Batch ARMarkov model for identification of a three input, three output system. Extension to any number of inputs and outputs is straightforward.

The above explicit replicator forms are fundamentally time domain representations of dynamic systems. For linear systems particularly, all of the above replicators can be generalized to frequency domain forms or mixed time and frequency domain forms.

To illustrate, consider the linear FIR system replicator in FIG. 11. Instead of providing the vector $[\xi(k), \ldots, \xi(k-L+1)]$ as the input to the left hand ganglion, we could use the output of a Finite Fourier Transform (FFT) operation on $\xi(k)$—i.e. the vector $[\mathcal{J}_0[\xi(k)], \ldots, \mathcal{J}_{L-1}[\xi(k)]]$ where:

$$\mathcal{J}_r[\xi(k)] = \frac{1}{L} \sum_{m=1}^{L} e^{ir(m-1)\frac{2\pi}{L}} \xi(k-m+1)$$

and where $L=2^N$ for some integer N and $r=0, 1, \ldots, L-1$. This operation is equivalent to multiplying the vector $[\xi(k), \ldots, \xi(k-L+1)]$ by a unitary matrix. With this alternative input, the replicator converges so that the elements of the weight matrix become the values of the FIR system frequency response evaluated at the discrete-time frequencies $r2\pi/L$, $r=0, \ldots, L-1$. Thus the use of FFT operations on the inputs can produce replicators that are effective frequency response analyzers. In addition, one could apply the FFT operation to the unknown system output $y(n)$ (see FIG. 11) and to the replicator output to arrive at the output error, $\bar{\epsilon}(n)$. In this case, the replicator output is trained to match the FFT components of $y(n)$. Even when y is generated by an IIR system, the converged synaptic weights match the true frequency response at the frequency points $r2\pi/L$, $r=0, \ldots, L-1$ (although good agreement at all frequencies cannot be guaranteed). Thus, insertion of the FFT operation yields replicators that can address frequency weighted output matching and good frequency response emulation. Since the FFT operation is tantamount to a simple unitary transformation, it can be inserted within the replicator inputs or system outputs at any location in any of the above forms of replicator to give useful frequency domain extensions of these devices.

Figure 17:
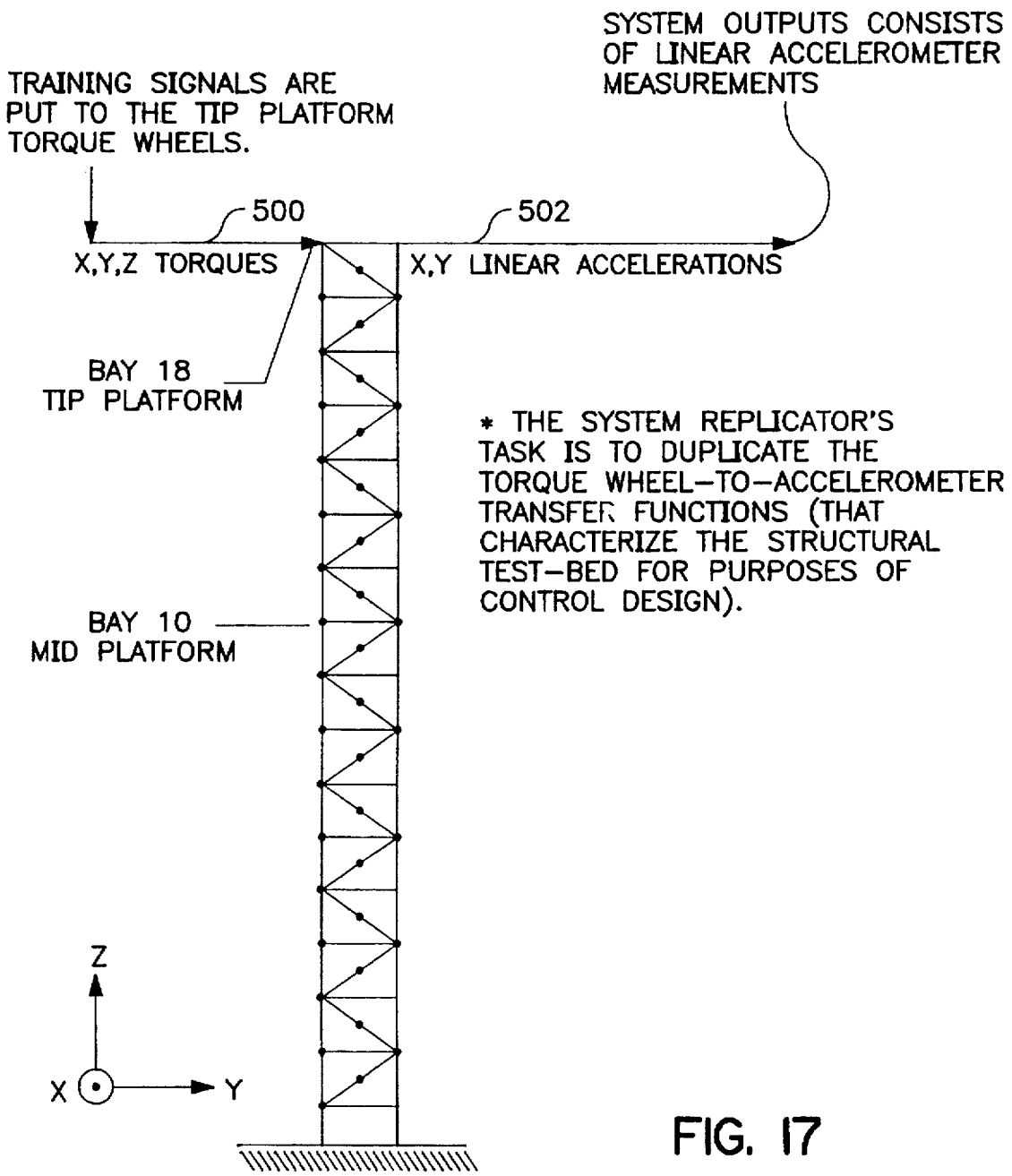
FIG. 17 is a simplified block diagram of the Mini-MAST testbed used to test neural replicators.
Figure 18:
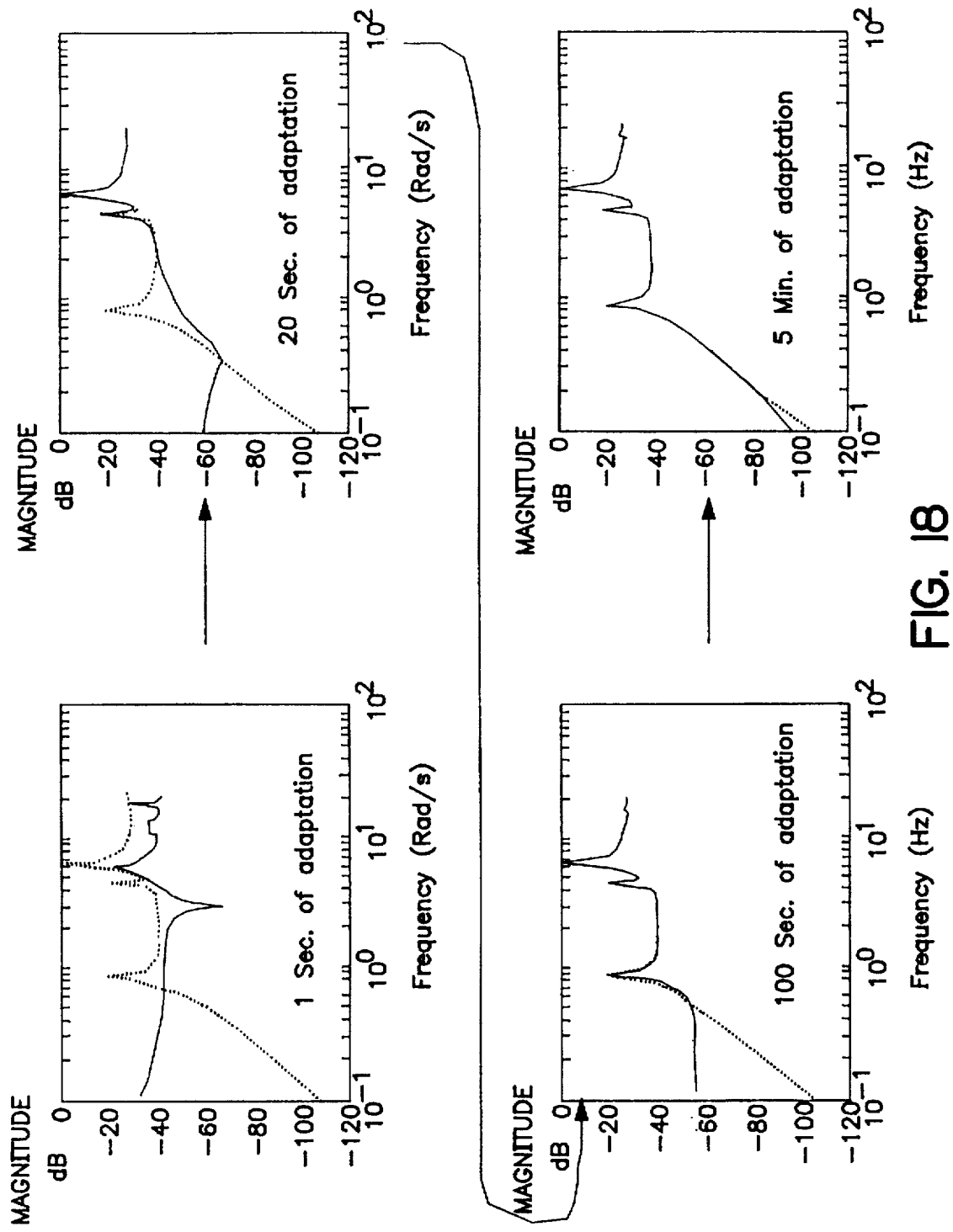
FIG. 18 illustrates autonomous system identification of the Mini-MAST testbed by showing a sequence of frequency responses obtained by the neural replicator.

The system and method of the present invention have been tested and implemented through simulation and laboratory results. In one test, a Mini-MAST testbed shown in FIG. 17 was used. The Mini-MAST is a vibration control testbed in the form of a 60 ft. high truss beam cantilevered to the floor. Instrumentation includes torque wheel actuators 500 at the top platform to provide control torques and accelerometers 502 to measure lateral vibration. The data acquisition system was operated at 40 Hz sample rate. Training signals were input to the torque wheels and the system outputs consist of the linear accelerometer measurements. In this experiment, Mini-MAST response data derived from actual test data was used. The system replicator's task was to duplicate the torque wheel-to-accelerometer transfer functions (that characterize the testbed for purposes of control design) using the scheme of FIG. 14. The weight matrices were initialized at zero and the learning rate, $\alpha$, was set to 1.0. FIG. 18 illustrates the results obtained from the system. With reference to FIG. 18, each chart depicts one of a sequence of comparisons between the actual system frequency response and the neural net frequency response at various time instants during the learning process. The neural replicator is seen to progressively "lock on" to one vibration mode after another, starting with the dominant modes near 10 Hz and finishing with the lowest frequency modes near 1 Hz. One hundred seconds of adaption produced an excellent neural replica and essentially exact agreement is reached, after five minutes of adaptation.

With reference once again to FIG. 3, the top portion of the hierarchy is adaptive control system 400 which may include plural replicator networks 300.

Figure 19:
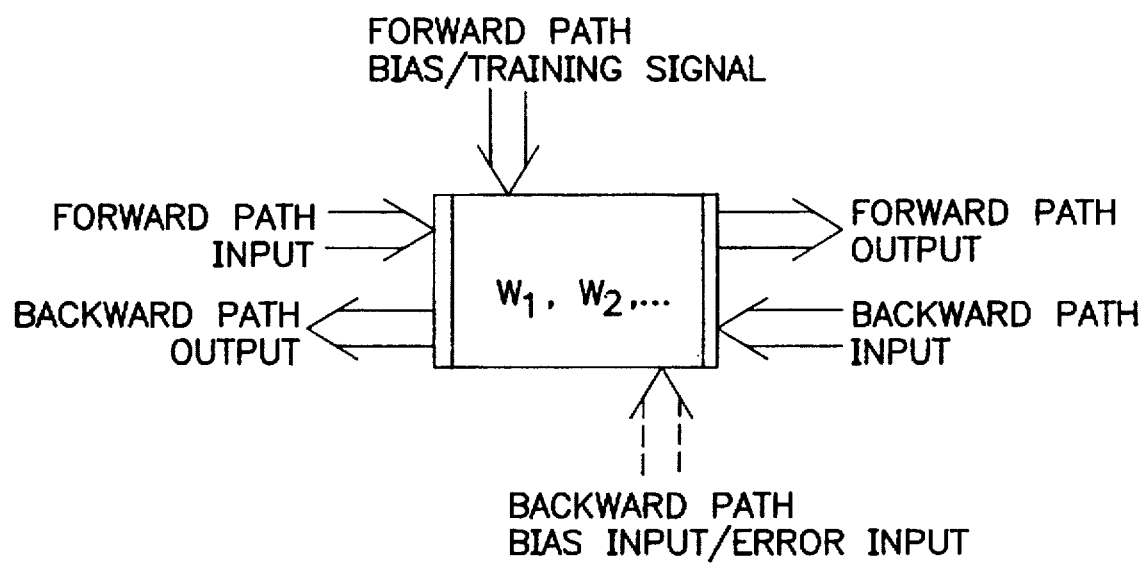
FIG. 19 shows the simplified block diagram convention for replicators of all types included in the invention.

To facilitate description, a block diagram convention for replicators of all types is given in FIG. 19. Note that although IIR replicators also receive "distant past" signals from the system output, this feature is suppressed in the block diagram for simplicity. Sometimes the backward path signals are indicated but these are normally understood implicitly and are omitted.

There are a variety of control system architectures that can be addressed with the disclosed architecture. The first considered is the Model Reference Adaptive control (MRAC) of a feedback control system. Here the nominal control arrangement uses feedback from system sensors to drive actuators so as to stabilize the system in the face of unmeasurable disturbances. The "Adaptive Neural Controller" (ANC) has the task of identifying the plant (system to be controlled) and adjusting the on-line controller so as to minimize the difference between the actual closed-loop system response and that of a "reference system" which is simply a digital filter constructed to represent the desired performance specifications.

Figure 20:
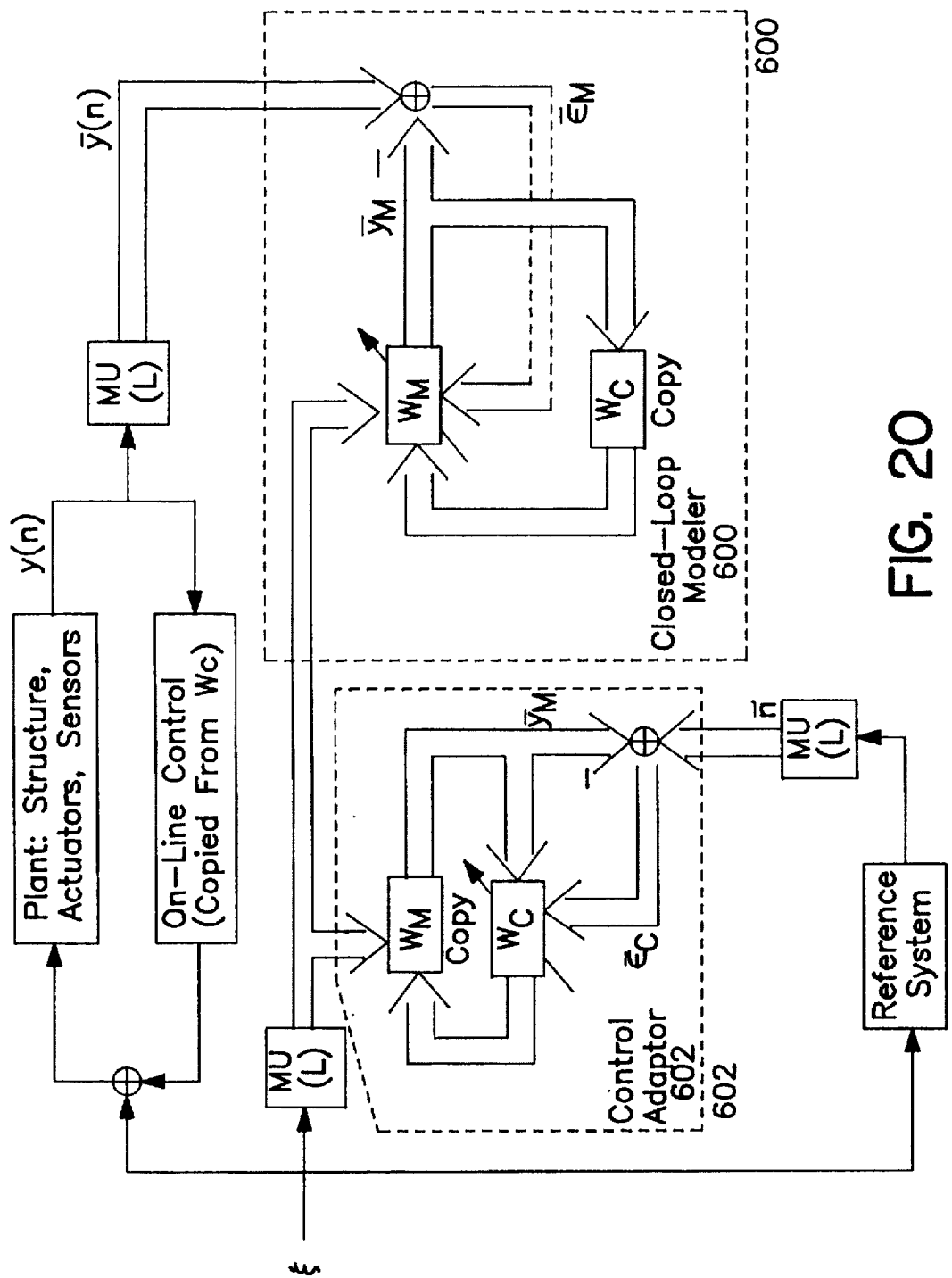
FIG. 20 is a simplified block diagram of one method for construction of an Adaptive Neural Controller according to the invention.

Even, within the above problem formulation there are several possible arrangements. FIG. 20 shows the most basic architecture for simultaneously replicating an unknown plant and adapting the controller so as to match the closed-loop input/output characteristics with a prescribed reference system. As shown, the ANC has two parts: (1) the closed-loop modeler 600 and (2) the control adaptor 602. Both parts use (as a minimum) two replicator units. The closed-loop modeler uses the training signal $\xi$ and the plant sensor outputs $y(n)$ to adapt the weights $w_M$ so that the closed-loop is replicated. When $\bar{\epsilon}_M \rightarrow 0$, the modeler output matches the closed-loop system—in effect the modeler identifies the plant within the closed loop. Note that in the modeler, $w_c$ (the control system replicator) is constrained to be equal to the current values being updated in the control adaptor.

In the control adaptor 602, $w_M$ is a copy of the value currently arrived at by the modeler, 600 while $w_c$ is unconstrained. $w_M$ is a "neural copy" of the plant. Thus the control adaptor can, in effect, back-propagate error through the plant to the controller output location. With its internal model of the plant, the adaptor 602 uses the training signal, its own output and that of the reference system to adjust $w_c$ so that the reference system is replicated.

Figure 21A:
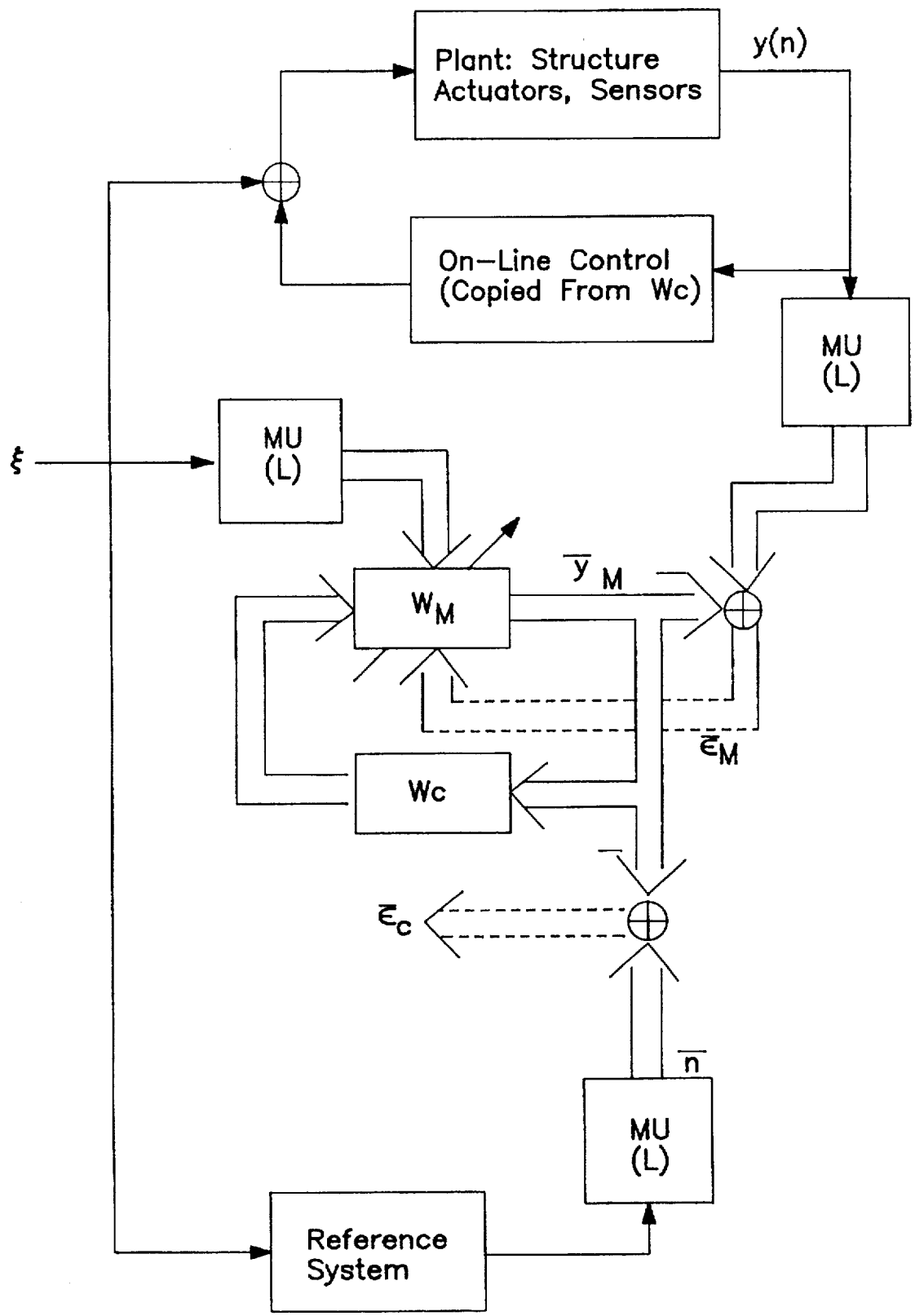
FIG. 21A is a simplified block diagram of an alternate arrangement of an Adaptive Neural Controller, according to the invention, when operating in the plant modelling mode.
Figure 21B:
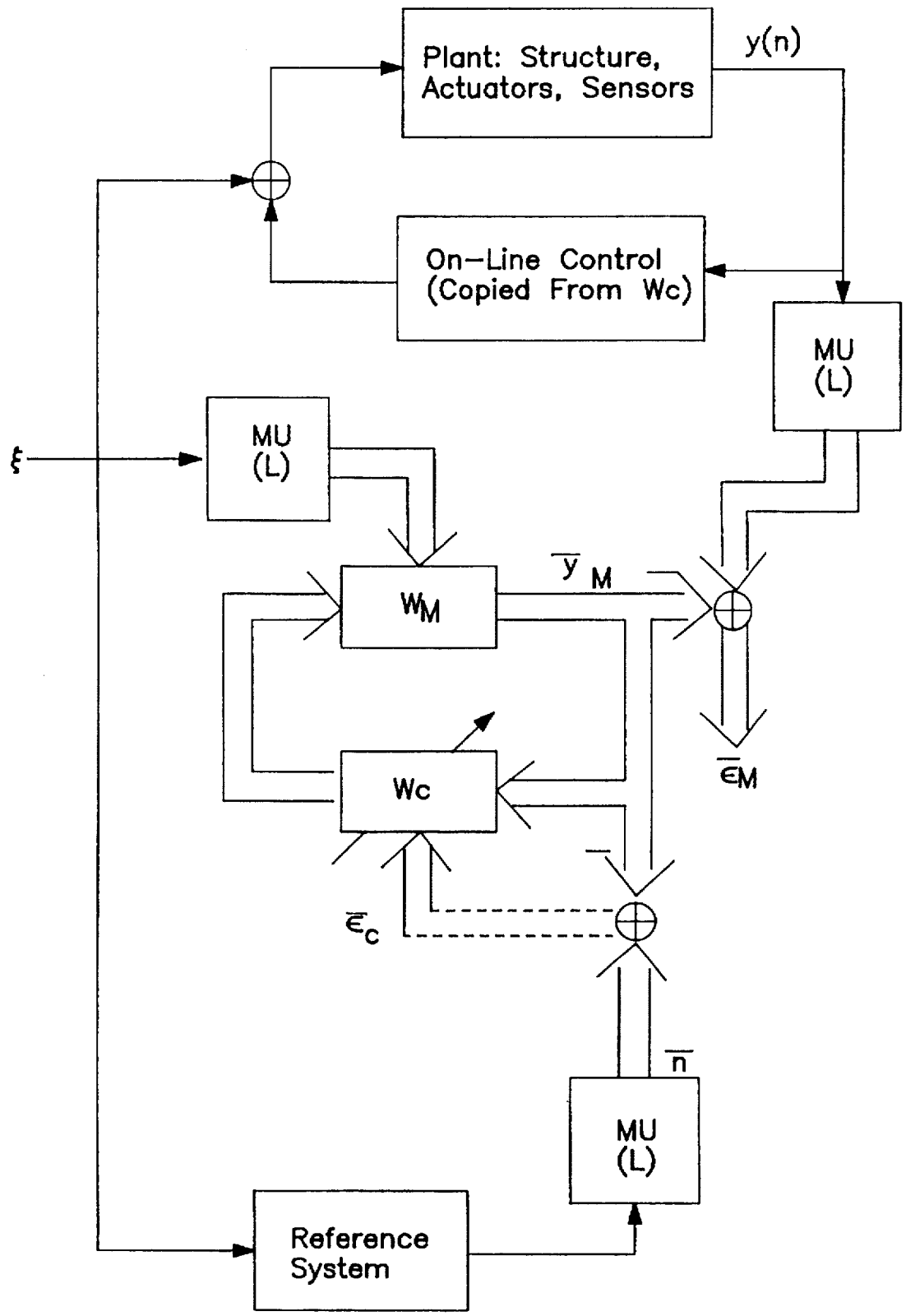
FIG. 21B is a simplified block diagram of an alternate arrangement of an Adaptive Neural Controller, according to the invention, when operating in the control adaptation mode.

The basic adaptive control setup shown in FIG. 20 has been laboratory tested and found to simultaneously converge on the internal plant model and the optimal controller. Subsequent studies have shown however, that a non-simultaneous "zig-zag" convergence approach is more efficient and requires half the neural hardware involved in the basic scheme. The system configuration for the zig-zag convergence approach is shown in FIG. 21. At any given time only the neural model or the controller are adapted, depending on the relative values of and $\|\bar{\epsilon}_c\|$. Initially, the system adapts only the plant model, $w_M$, holding the controller, $w_c$ fixed, as shown in FIG. 21A. When the model error, $\|\epsilon_M\|$, falls below some fraction (say $\frac{1}{10}$) of the control suboptimality, $\|\epsilon_C\|$, the system switches to the mode of operation shown in FIG. 21B in which the control is adapted with the neural plant model held fixed. This continues until $\|\epsilon_C\|$ falls below $\|\epsilon_M\|$ (when model error is the performance limiter so that further control adaptation is futile) whereupon the system switches back to the modelling mode (FIG. 21A). These alternating sessions of model refinement and control adaptation continue until present tolerances are reached and further adjustments cease. The zig-zag approach actually permits the use of larger values of adaptive learning constants and therefore converges faster overall. Also, only half the hardware of the basic scheme is required by the zig-zag convergence approach.

Figure 22:
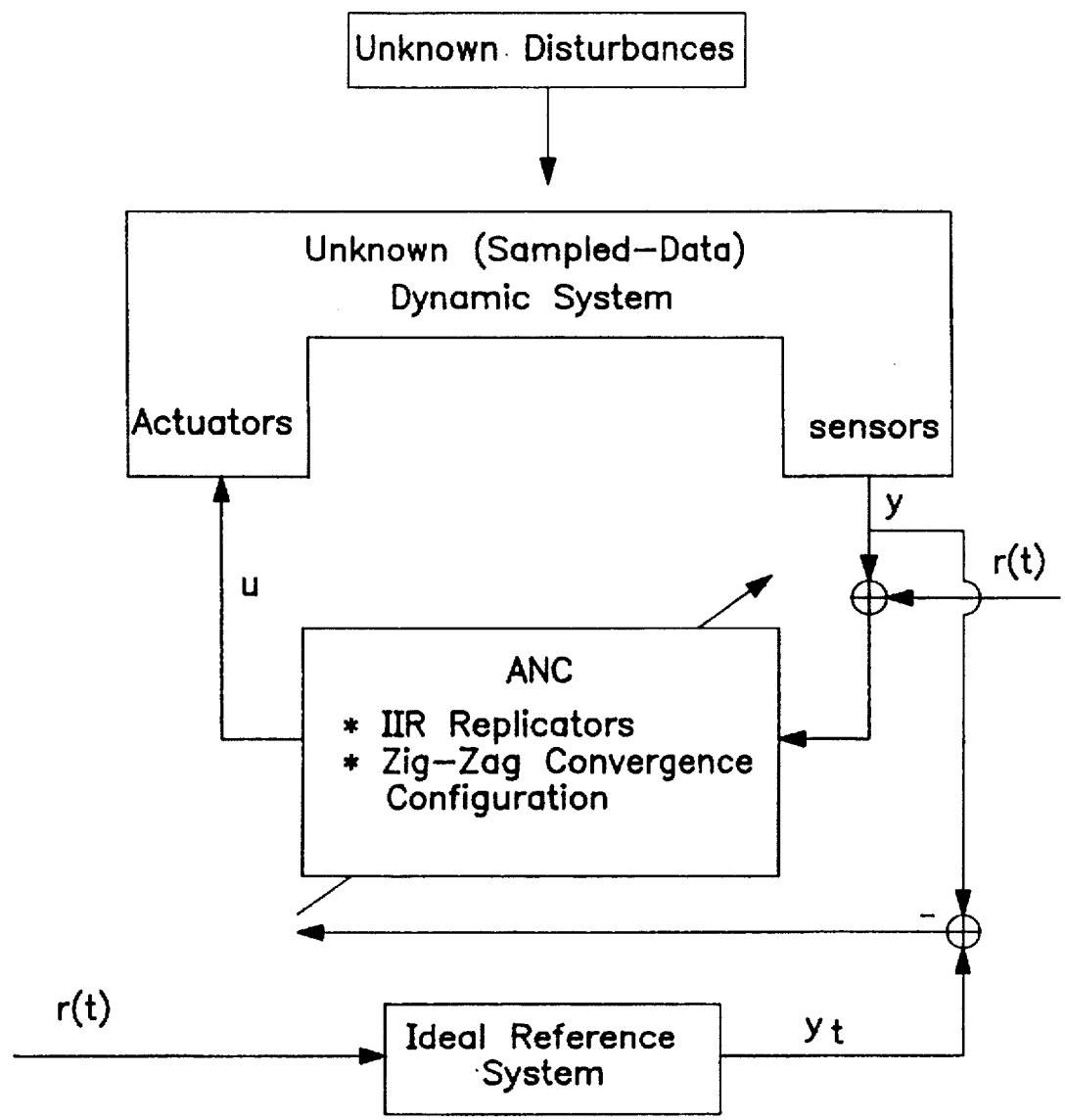
FIG. 22 is a simplified block diagram of an alternate arrangement of an Adaptive Neural Controller, according to the invention, when the objective of the controller is to track a time varying command signal.

A slight variant on the above MRAC system involves the goal of closed loop tracking of a command signal, r(t). This is illustrated in FIG. 22. In this case the basic structures in FIGS. 20 or 21 are not altered, however, the system adaptation can now be driven by the nonzero command signal and an external training signal is not needed.

Figure 23:
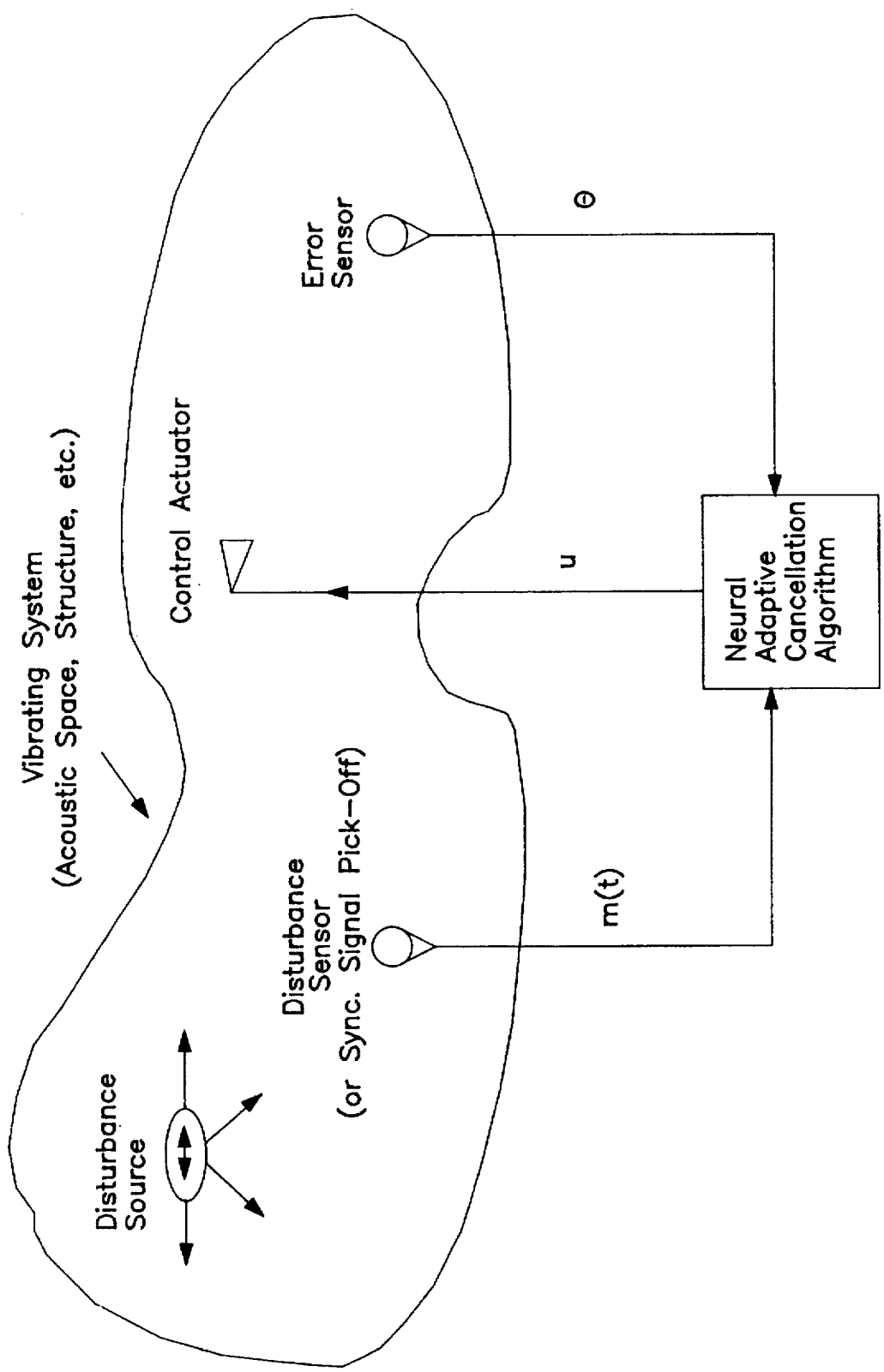
FIG. 23 is a simplified block diagram of an adaptive feedforward disturbance cancellation system constructed according to the invention.

Most of the foregoing description dealt with adaptive feedback control. A large subset of applications, however involve disturbance sources (motors, engines, rotors, etc.) that are accessible to direct measurement and, hence can be suppressed via adaptive feedforward control. FIG. 23 illustrates the typical situation. Fundamentally, the control problem devolves to an identification problem. The primary input to the neural controller is a synchronization signal taken directly from the vibration source (if it is periodic) or some other disturbance measurement. The neural controller adjusts its parameters, using the outputs of error sensors, (which measures noise or vibration at points were quiescence is desired) and transforms the disturbance measurement m into the actuator drive signal u, using its identified models of the transfer functions from m to e and u to e. Once the algorithm has converged, the output of the actuators cancels the disturbance at the locations of the error sensors.

The ANC architecture is readily applied to handle the feedforward situation. The adaptive neural controller for feedforward is able to simultaneously identify all needed transfer functions and adapt the actuator inputs without interrupting normal operation or injecting an extraneous broadband test signal (dither). Moreover, the adaptive algorithm is fast: with no previous identification, completed cancellation is achieved in three iterations; once transfer coefficients are identified, control adjustment can be accomplished in one step. Thus the neural controller is able to autonomously react to rapid changes in the disturbances or in the system dynamic characteristics.

When disturbances are accessible to (at least indirect) measurement, a unique feature of the ANC architecture is that it can combine feedforward control with feedback control. These two forms of control have synergistic benefits. First feedback greatly improves transient response and this permits faster feedforward convergence. Also, closed-loop feedback smoothes out the system transfer functions. This allows the feedforward control to track much more rapid system changes——e.g. disturbance frequency variations due to motor acceleration/deceleration. Alternatively, smoother transfer function variations permit a simpler and cheaper feedforward system to be used.

The basic ANC schemes, discussed above may be further refined, for the purpose of obtaining rapid fault detection and controller recovery.

A considerable degree of fault tolerance is already implicit in the basic ANC architecture. ANC provides on-line solution of the optimization problem, dealing with complex constraints (e.g., from sensor and actuator limitations) implicitly. If sensor, actuator or structure hardware fails, ANC merely solves the optimization problem under new constraints—achieving convergence to a new controller that is optimal under the new set of hardware limitations. If an abrupt system change occurs however, the controller can recover only at a rate comparable to its convergence when starting with a "blank slate" as in the examples given above. For typical feedback control problems, involving tens of states, this recovery period is several minutes—too long to prevent serious performance degradation in the interim.

The convergence speed or recovery rate has certain fundamental limitations. There are two factors limiting the adaptive speed. First, there is an inescapable upper limit to the learning rate constants due to the need to avoid oscillatory divergence. Secondly, the average (time-average) rate of convergence is inversely proportional to the number of synaptic weights under adjustment (typically of order $10^2$).

Figure 24:
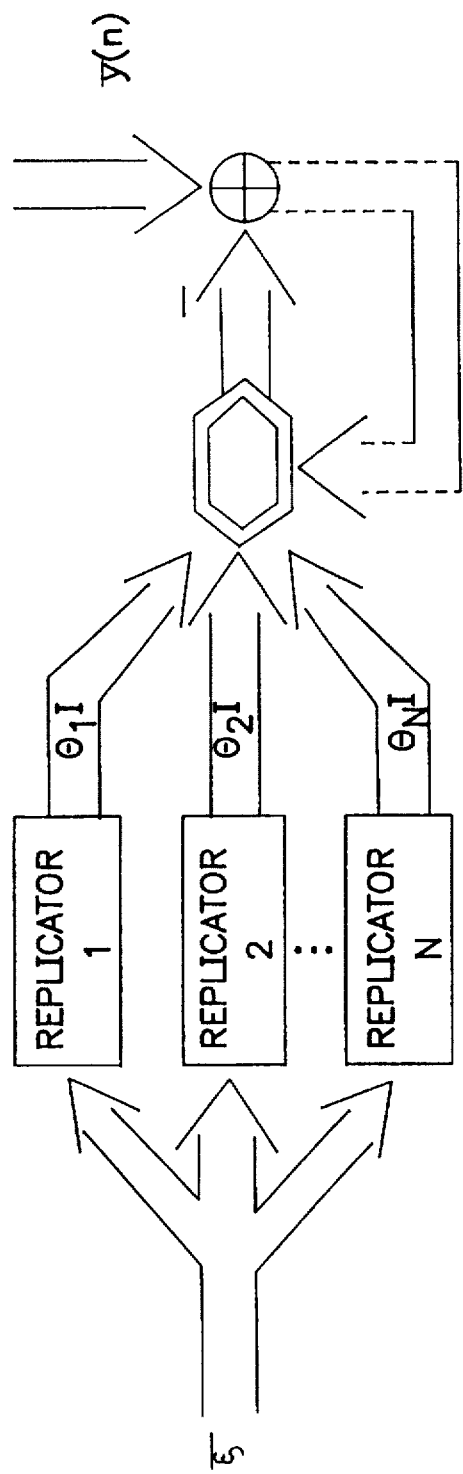
FIG. 24 is a simplified block diagram of a competitive model arrangement for system replication according to the invention.

One solution to reducing the convergence time, is to adjust a very small number of synaptic weights first and fine-tune the rest later. Specifically, in place of the single replicator, the system can use a bank of N replicators. As indicated in FIG. 24 the outputs of the replicators are fed, via Toeplitz synapses constrained proportional to identity, into an output ganglion. Each of the replicators is, essentially, an alternative model. The total output is a linear combination of these models, with coefficients $\Theta_1, \ldots, \Theta_N$. If $\Theta_1, \ldots, \Theta_N$ denote the least squares optimal values, we have:

$$\frac{E[\|\Theta_k(n+1) - \Theta_k^*\|]}{E[\|\Theta_k(n) - \Theta_k^*\|]} \cong \left(1 - \frac{1}{N^2}\left(\alpha - \frac{1}{4}\alpha^2\right)\right)^{1/2}$$

Thus if N is of modest size, the $\Theta_k$'s converge very rapidly. Usually, that $\Theta_k$ associated with the replicator that happens to be closest to the unknown system to be replicated is largest. This replicator then becomes fine tuned faster than all the others. Ultimately only one of the $\Theta_k$'s is nonzero. In essence, this scheme sets up a "model competition" where the "winner" is determined quickly and then becomes fine-tuned at a slower rate. All the losers are ultimately disconnected from the output.

Figure 25:
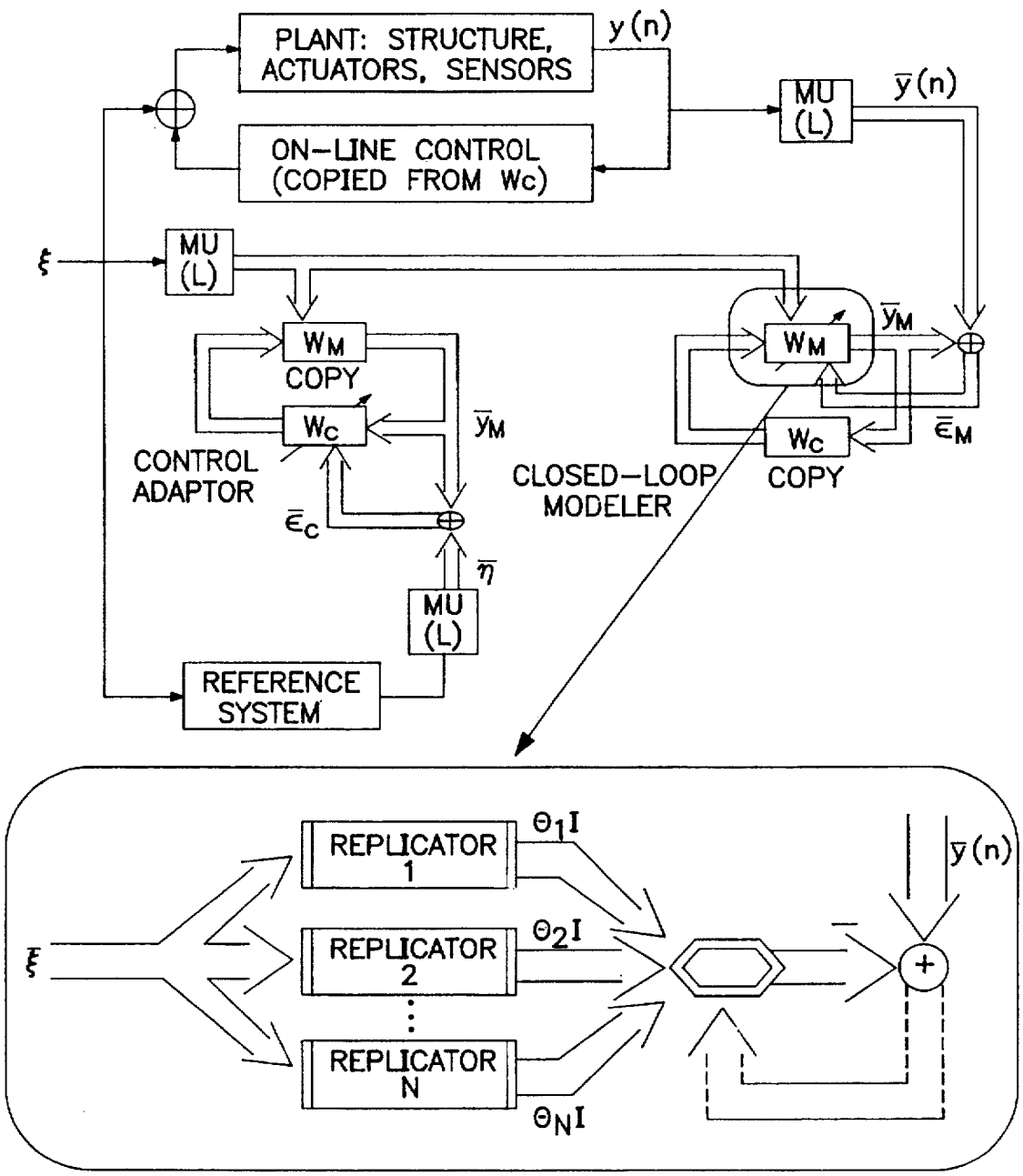
FIG. 25 is a simplified block diagram showing the use, according to the invention, of a competitive model replicator within an overall Adaptive Neural Controller.
Figure 26:
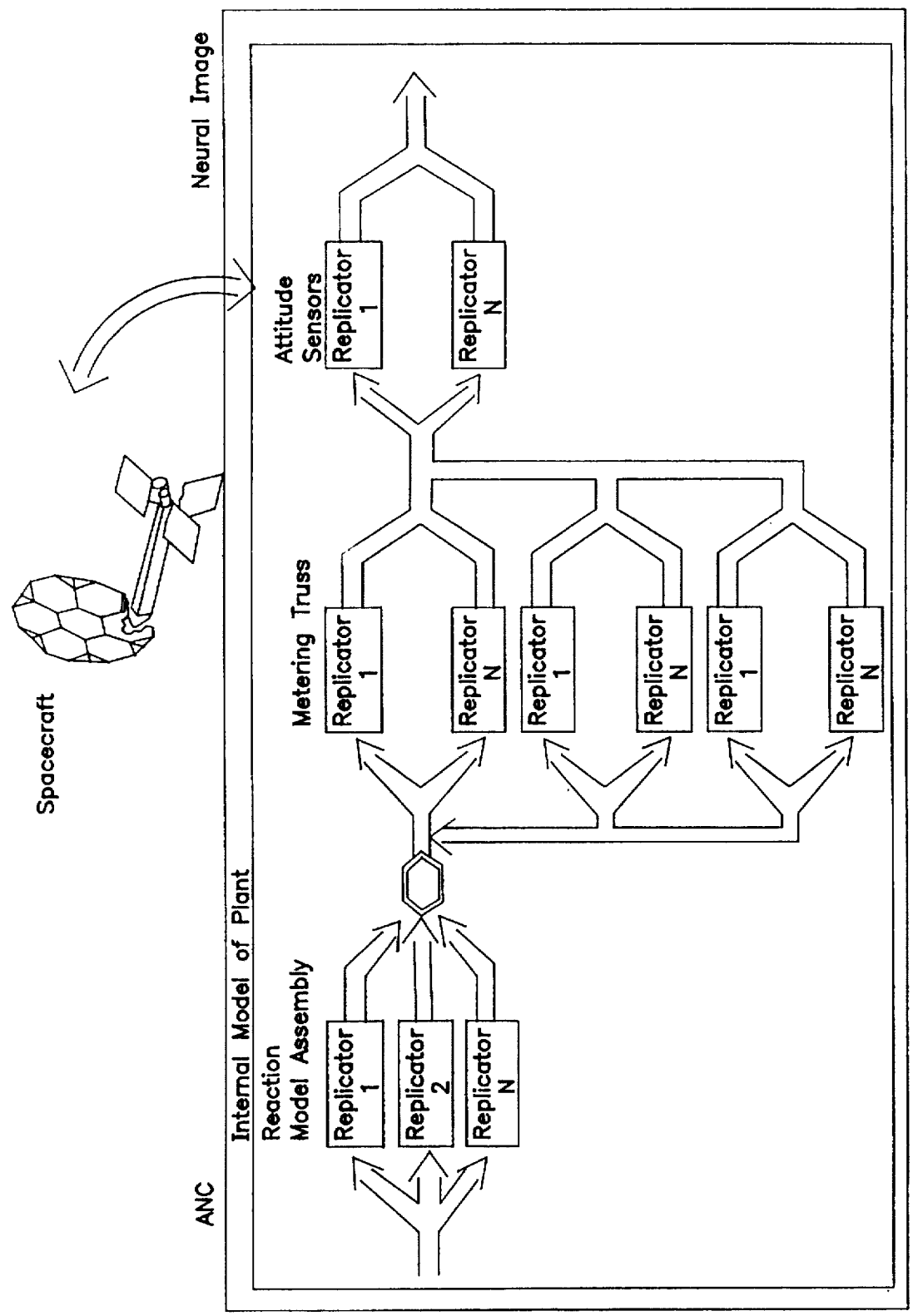
FIG. 26 is a simplified block diagram of an articulated, competitive model replicator system, designed according to the invention for the purpose of on-line fault location.

From the above discussion, it is seen that we may extend the ANC architecture to achieve rapid failure detection and controller recovery by replacing each replicator unit in the original scheme by a competitive replicator array. This extension is illustrated in FIG. 25. Each replicator in the competitive array corresponds to a particular operating condition of the system—nominal or off-nominal with various failure modes. When the system abruptly changes operating mode (from nominal to one of the failure modes, for example), the competitive participation factors, (the $\Theta_k$'s) rapidly change to bring the replicator corresponding to the correct operating mode on-line, disconnecting all the other replicators. Thus, the ANC's internal model of the system is quickly adjusted to fit the new operating condition. Likewise, replicators in the array associated with the controller represent different controllers, each of which is tuned to a particular operating condition. Thus, if a system hardware failure occurs, then both the internal model and the controller are quickly re-adjusted to conform to the new conditions. Of course, such rapid recovery requires prior training of the network so as to configure all of the replicators to match likely failure modes. This might be done at the outset, either off-line or in operation, by training each replicator against a simulated failure mode. Training could also be accomplished during operational life as long as sufficient neural redundancy is built in. In this case, the ANC would slowly recover after the first instance of a particular failure mode but thereafter, having stored this off nominal condition in its "memory", would recover quickly from any repetition of the same failure event. The above extensions give the capability to detect that a fault of some type has occurred but do nothing to specifically locate the fault within the system hardware. To achieve precise fault location, one would use networks of replicators that are articulated to represent a subsystem/component model of the system. As illustrated in FIG. 26, the plant replicator would be replaced by a more complex aggregation of competitive replicator arrays, each array representing a particular subsystem, structural assembly or hardware unit. This "neural image" of the system has a structure homologous to the overall system (an autonomous spacecraft in FIG. 26) with its several components. Off-nominal operation in any component can be detected by reading out the participation factors of the array and comparing with nominal values. By this means, both the location and the specific character of the failure can be determined. At the same time, of course the ANC autonomously adapts to the failure condition.

Thus, in summary, use of neural redundancy in the form of competitive model arrays is an attractive elaboration of the fundamental ANC scheme in order to achieve extra rapid fault detection and controller recovery.

Because of the massive parallelism of the architecture of the present invention, it is possible to "slice the computational pie" in many different ways in order to design modular computation hardware to implement these architectures. Presently, it is not necessarily desirable or most efficient to implement the computational modules described above as literally a collection of neurons as defined in FIG. 4A linked by synapses as defined in FIG. 5A. For example, the ANC can be viewed as a massively parallel, decentralized adaptive control algorithm and considered as such it can be implemented in any configuration involving parallel processing hardware that is capable of executing the complete algorithm. In other words, the parallel, decentralized architecture explained in the foregoing in terms of neural networks has a multitude of equivalent realizations (many of which do not explicitly relate to neural networks per se) which involve different methods of subdividing the same decentralized tasks into a variety of submodules. Corresponding to each method of subdividing the total computational task, there is a processor hardware implementation involving a parallel processing structure. Many of these possible hardware implementations are suitable for existing Digital Signal Processor (DSP) hardware.

As an example of the plethora of equivalent realizations, we consider how to compartmentalize the ANC algorithm into several standard components in a manner that differs from the preceding descriptions in that nonlinear functions are segregated from the primarily linear operations.

Figure 27:
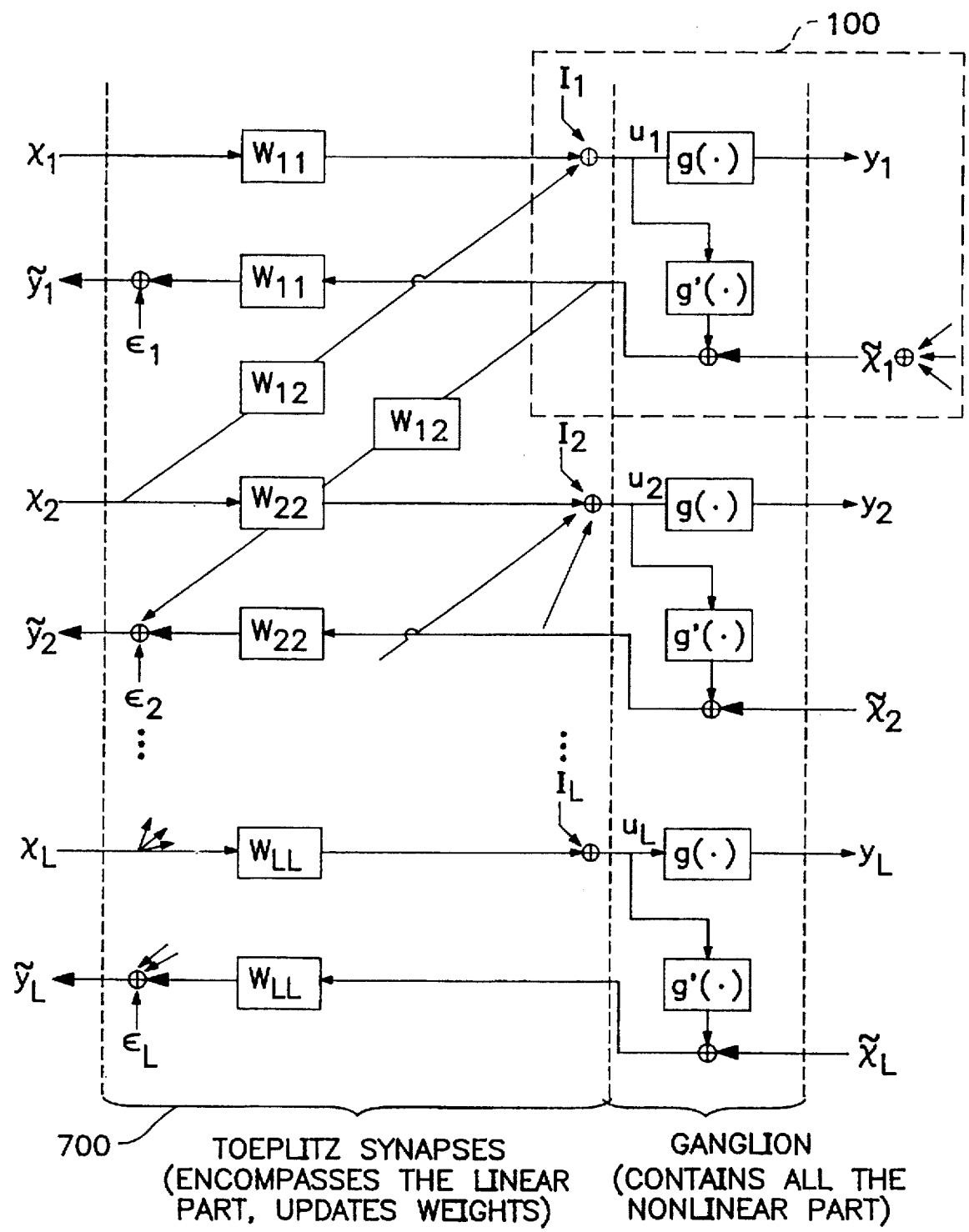
FIG. 27 is a simplified block diagram of an alternate but equivalent apportionment of data processing tasks, according to the invention.

For example, FIG. 27 shows a detailed diagram of Toeplitz synapse and ganglion connection. The standard neuron 100 is shown within a dashed border. Instead of implementing a set of hardware embodiments of such neurons, the system can be partitioned as indicated in the FIG. 27 into a new "Toeplitz synapse" 700 which now includes only the linear input-output operations. Proceeding in this way, the ANC can be composed of four standardized components:

1. Toeplitz Synapse (with slightly modified definition, FIG. 28A and 28B).
2. Neural Dynamic Ganglion (modified definition, FIG. 29).
3. Branch/Sum Junctions (in FIG. 30).
4. Memory Unit (a form of tapped delay line, defined as above).

Figure 31:
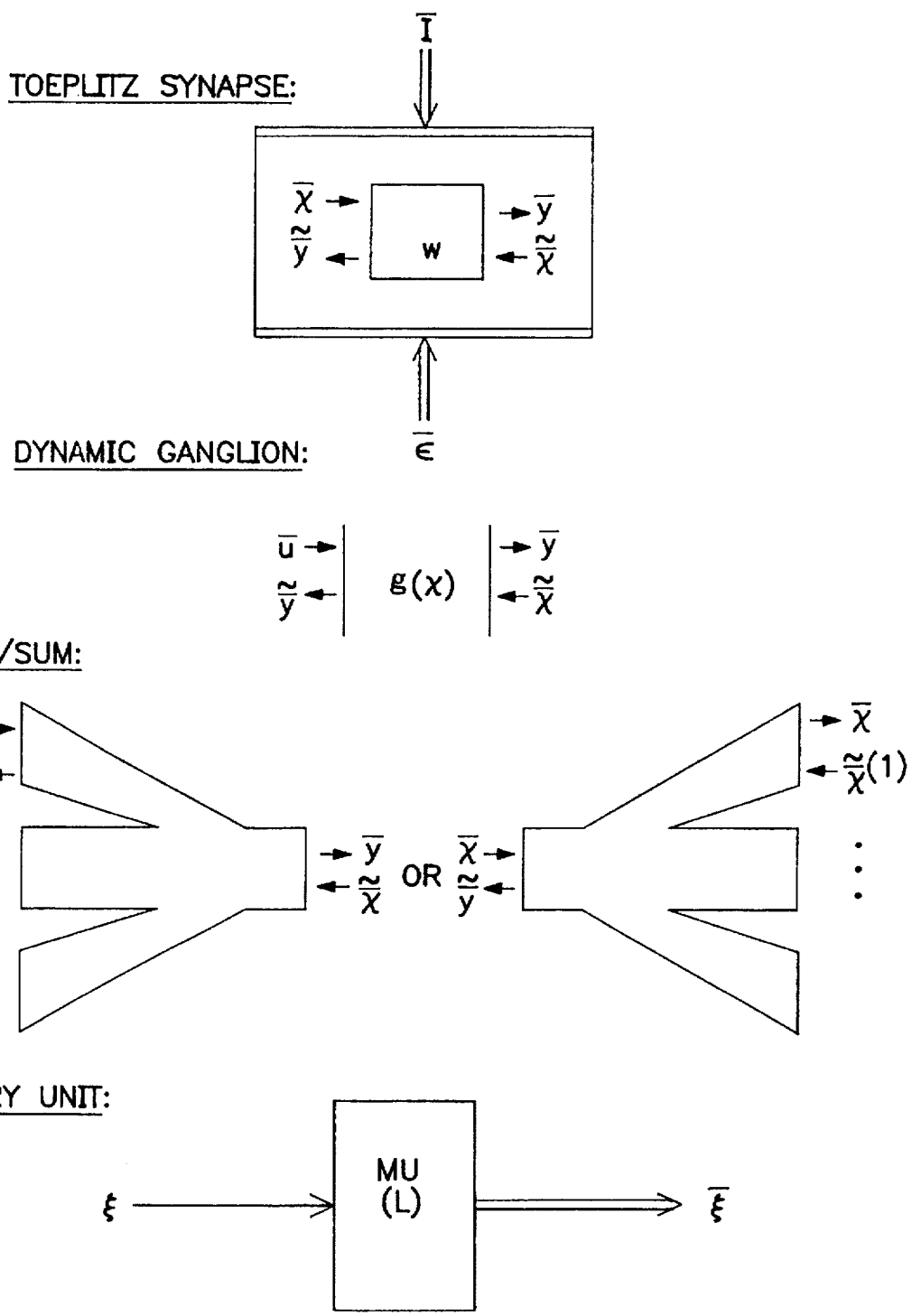
FIG. 31 shows block diagram conventions for the alternate but equivalent set of modules that can form the constituents of systems constructed according to the invention.

When compartmentalized in the above manner (with block diagram notations as shown in FIG. 31) ANC can be readily implemented on commercial, off-the-shelf hardware. Special purpose neural net hardware is not necessary.

There are many other equivalent representations and compartmentalizations. For example, the functions can also be allocated in larger pieces i.e. whole replicators could be allocated to individual DSP cards, etc. Thus, the present invention is not limited to the neural network realization of the massively parallel, decentralized adaptive processing architecture that is described herein but also encompasses any equivalent realization and reallocation (among separate parallel processing units) that executes the same computational tasks. In summary, considering a variety of potential situations, the massively parallel, decentralized adaptive processing systems and methods described herein can be implemented using existing digital signal processing hardware, used singly or combined in multiprocessor systems.

While the present invention has been described in terms of particular examples, those of skill in the art will understand based on the material presented that this is merely for the convenience of explanation and not intended to be limiting. According, it is intended to include the variations described herein and other variations modifications and adaptations which will occur to those of skill in the art without departing from the spirit and scope of the invention as set forth in the claims when accorded a full range of equivalents.

What is claimed is:

1. An adaptive control system for controlling a plant, said plant having an output signal related to a state of said plant and an actuator responsive to an input signal, comprising a neural network comprising:

a plurality of neurons, each neuron having a forward and backward signal path, said forward signal path receiving a forward input signal and providing a forward output signal related to said forward input signal and a forward neural function, and said backward signal path receiving a backward input signal and providing a backward output signal related to the backward input signal and a backward neural function;

a plurality of synapses, each synapse having a forward and backward signal path, said forward signal path receiving a forward input signal and providing a forward output signal related to said forward input signal and a gain signal, and said backward signal path receiving a backward input signal and providing a backward output signal related to the backward input signal and said gain signal, and said synapses interconnecting the signal paths of said neurons; and, wherein said neurons and said synapses are arranged in a plural ganglia, each ganglion having an array of L neurons allocated as a unit to process a time series signal and its L−1 delayed values, each ganglia receiving a input signal from a tapped delay line, and one of said ganglia providing a network output signal;

an on-line control system receiving an output signal from said plant and providing an input control signal to said actuator;

a control adaptor said neural network configured to model said plant and said neural network configured to model said on-line control system, said control adaptor receiving input signals related to signal supplied to said actuator and comparing the network output signal with a reference signal related to a desired response of the plant to said signals applied to said actuator, and for injecting differences between the network output signal and the desired response into the backward signal path of the output ganglion of the neural network modelling the on-line control system and adjusting the gains of the synapses to reduce said differences;

a closed-loop modeler said neural network configured to model said plant and said neural network configured to model said on-line control system, said closed loop modeler receiving input signals related to the signal supplied to said actuator and comparing the network output signal of said plant model with a signal related to response of the plant and for injecting differences between the network output signal and the plant response into the backward signal path of the output ganglion of the neural network modelling the plant and adjusting the gains of the synapses to reduce said differences;

wherein the rains of the synapses of said closed-loop modeler are not changed simultaneously with chances to the gains of the synapses of said control adapter.

2. A method of controlling a plant, said plant having a controllable actuator for varying a characteristic of the plant, a sensor for measuring a characteristic of the plant, and a programmable on-line feedback control system which operates the actuator in response to the measurements of the sensor, said neural network comprising:

a) providing a model of the plant, said model comprising said neural network;

b) providing a model of the on-line control system; said model comprising said neural network;

c) providing a time series of signals to operate the actuator;

d) measuring the response of the plant to the time series of signals;

e) updating for a first time period the plant model from the measured responses of the plant without updating the model of the control system;

f) updating for a second time period the model of the control system without updating the model of the plant;

g) alternating steps (e) and (f) until the error of the plant model is within a predetermined range.

3. The method of claim 2 wherein step (g) is continued until the error of the control system model is within a predetermined range.

* * * * *